(12) United States Patent
Yamamura

(10) Patent No.: US 12,198,388 B2
(45) Date of Patent: Jan. 14, 2025

(54) ADJUSTED IMAGE DATA GENERATING DEVICE, COLOR DIFFERENCE ADJUSTED IMAGE DISPLAY SYSTEM, ADJUSTED IMAGE DATA GENERATION METHOD, ADJUSTED IMAGE DATA GENERATION PROGRAM, AND COLOR DIFFERENCE ADJUSTED IMAGE DISPLAY METHOD

(71) Applicant: SANYO-CYP CO., LTD., Osaka (JP)

(72) Inventor: Kenji Yamamura, Osaka (JP)

(73) Assignee: SANYO-CYP CO., LTD., Osaka (JP)

( * ) Notice: Subject to any disclaimer, the term of this patent is extended or adjusted under 35 U.S.C. 154(b) by 30 days.

(21) Appl. No.: 17/599,397

(22) PCT Filed: Mar. 27, 2020

(86) PCT No.: PCT/JP2020/014126
§ 371 (c)(1),
(2) Date: Sep. 28, 2021

(87) PCT Pub. No.: WO2020/203813
PCT Pub. Date: Oct. 8, 2020

(65) Prior Publication Data
US 2022/0044445 A1 Feb. 10, 2022

(30) Foreign Application Priority Data
Mar. 29, 2019 (JP) .................. 2019-067404

(51) Int. Cl.
G06T 7/90 (2017.01)
G06T 7/00 (2017.01)
(Continued)

(52) U.S. Cl.
CPC .................. *G06T 7/97* (2017.01); *G06T 7/90* (2017.01); *G09G 3/2003* (2013.01); *G09G 2320/0666* (2013.01)

(58) Field of Classification Search
CPC .. H04N 1/46; H04N 1/48; H04N 1/56; H04N 1/60; H04N 1/6019; H04N 1/6027;
(Continued)

(56) References Cited

U.S. PATENT DOCUMENTS 5,113,251 A * 5/1992 Ichiyanagi ............... H04N 1/58
358/453
6,262,817 B1 * 7/2001 Sato ..................... H04N 1/6011
358/518
(Continued)

FOREIGN PATENT DOCUMENTS

JP H05-103336 A 4/1993
JP 2001-045516 A 2/2001
(Continued)

OTHER PUBLICATIONS

International Search Report issued in PCT/JP2020/014126; mailed Jun. 9, 2020.
(Continued)

Primary Examiner — Wesner Sajous
(74) Attorney, Agent, or Firm — Studebaker & Brackett PC

(57) ABSTRACT

An adjusted image data generating device includes storage and an adjusting section. The storage stores color reference data of a color reference therein. The adjusting section generates adjusted image data by adjusting an object image for image data representing a color reference image and the object image so that color data of a color reference image matches the color reference data. The color reference image is an image of a color reference. The image data is an image of an object.

15 Claims, 15 Drawing Sheets

(51) Int. Cl.
*G06T 11/00* (2006.01)
*G09G 3/20* (2006.01)
*H04N 1/46* (2006.01)
*H04N 1/60* (2006.01)
*H04N 9/73* (2023.01)

(58) Field of Classification Search
CPC .. H04N 1/6041; H04N 1/6052; H04N 1/6075; H04N 1/6077; H04N 17/02; H04N 17/04; H04N 9/73; H04N 23/88; H04N 23/84; G06T 11/001; G06T 7/90; G06T 7/97; G09G 5/02; G09G 5/06; G09G 2320/0666; G09G 3/2003; G09G 2320/00; G09G 2320/02; G09G 2320/0242; G09G 2320/0271; G09G 2320/0276; G09G 2320/0285; G09G 2320/04; G09G 2320/06; G09G 2320/0613; G09G 2320/0626; G09G 2320/066; G09G 2320/0693
See application file for complete search history.

(56) References Cited

U.S. PATENT DOCUMENTS

| | | | |
|---|---|---|---|
| 6,766,050 | B1 | 7/2004 | Saikawa et al. |
| 7,020,331 | B2 | 3/2006 | Saikawa et al. |
| 7,636,473 | B2 | 12/2009 | Imai et al. |
| 2002/0118210 | A1* | 8/2002 | Yuasa ............ H04N 1/6052 345/589 |
| 2004/0240728 | A1 | 12/2004 | Saikawa et al. |
| 2005/0213128 | A1 | 9/2005 | Imai et al. |
| 2006/0061841 | A1* | 3/2006 | Osawa ............ H04N 23/88 358/518 |
| 2010/0067030 | A1 | 3/2010 | Imai et al. |
| 2011/0032380 | A1* | 2/2011 | Ishida ............ H04N 1/6033 348/E9.051 |
| 2012/0294822 | A1* | 11/2012 | Russo ............ A61K 45/06 424/135.1 |
| 2014/0240341 | A1* | 8/2014 | Oda ............ G09G 5/02 345/590 |
| 2017/0310854 | A1* | 10/2017 | Yamaguchi ...... H04N 1/6008 |
| 2018/0013926 | A1* | 1/2018 | Yamaguchi ...... H04N 1/6055 |
| 2018/0260946 | A1 | 9/2018 | Fan Jiang |
| 2018/0338067 | A1* | 11/2018 | Kuroiwa ......... H04N 1/6033 |
| 2019/0297226 | A1* | 9/2019 | Ohkubo ......... H04N 1/60 |

FOREIGN PATENT DOCUMENTS

| | | | | |
|---|---|---|---|---|
| JP | 2002-010283 A | | 1/2002 | |
| JP | 2003-179939 A | | 6/2003 | |
| JP | 2008072667 A | * | 9/2006 | ........ H04N 5/445 |
| JP | 2008-206163 A | | 9/2008 | |
| JP | 2011-060270 A | | 3/2011 | |
| JP | 2016-061876 A | | 4/2016 | |
| JP | 2018-098630 A | | 6/2018 | |

OTHER PUBLICATIONS

Search Report and Written Opinion mailed by the the Intellectual Property Office of Singapore on Mar. 28, 2024, issued in Singaporean Patent Application No. 11202110800U which is related to U.S. Appl. No. 17/599,397.

* cited by examiner

ADJUSTED IMAGE DATA GENERATING DEVICE, COLOR DIFFERENCE ADJUSTED IMAGE DISPLAY SYSTEM, ADJUSTED IMAGE DATA GENERATION METHOD, ADJUSTED IMAGE DATA GENERATION PROGRAM, AND COLOR DIFFERENCE ADJUSTED IMAGE DISPLAY METHOD

TECHNICAL FIELD

The present invention relates to an adjusted image data generating device, a color difference adjusted image display system, an adjusted image data generation method, an adjusted image data generation program, and a color difference adjusted image display method.

BACKGROUND ART

Recently, e-commerce is becoming more and more popular and opportunities increases for a trader to proceed with transaction without directly checking an object of the transaction. In this case, the transaction proceeds while the object is displayed on a display device in order for the trader to check the object.

However, it is known that strictly, the color of an image of the object displayed by a display device may differ from the color of the object itself. While color is an important factor for example for clothing, shoes, cosmetics, and decorations, the display device cannot sufficiently reproduce the colors of these objects, which is a problem to proceed with favorable transaction.

Furthermore, remote diagnosis and remote treatment using display devices have been promoted in recent years. In this case, also, important factors in decision on medical examination and/or treatment include a patient's complexion and/or the color of an affected area. However, display devices are not able to sufficiently reproduce the colors of these objects.

Therefore, the color of an image of an object displayed by a display device is demanded to exhibit the color of the object itself. For example, it is known that an external light sensor is attached to an image display device and an image displayed by the image display device according to image data is detected by the external light sensor to enable calibration of the image data (see Patent Literature 1). In Patent Literature 1, the external light sensor itself is calibrated to cause the color of the image of the object displayed by the display device to exhibit the color of the object itself.

CITATION LIST

Patent Literature

[Patent Literature 1] Japanese Patent Application Laid-Open Publication No. 2016-61876

SUMMARY OF INVENTION

Technical Problem

However, the image display device of Patent Literature 1 needs to be provided with the external light sensor. As such, it is difficult for a typical display device to reproduce the color of an object itself with the color of an image of the object.

The present invention has been made in view of the foregoing and has its object of providing an adjusted image data generating device, a color difference adjusted image display system, an adjusted image data generation method, an adjusted image data generation program, and a color difference adjusted image display method that generate adjusted image data that enables exhibition of the color of an image of an object with high reproducibility.

Solution to Problem

A color difference adjusted data generating device according to an aspect of the present invention includes storage and an adjusting section. The storage stores color reference data of a color reference therein. The adjusting section generates adjusted image data by adjusting an object image for image data representing a color reference image and the object image so that color data of the color reference image matches the color reference data. The color reference image is an image of the color reference. The object image being an image of an object.

The adjusting section deletes a part of the color reference image from the adjusted image data.

In an embodiment, the adjusting section acquires a difference between the color reference data and the color data.

In an embodiment, the adjusting section generates a color reference adjustment table based on the color reference data and the color data. The adjusted section generates adjusted image data by adjusting image data representing an additional object image based on the color reference adjustment table. The additional object image being an image of an additional object.

In an embodiment, the storage stores therein a color conversion table used for color signal conversion between the adjusted image data generating device and a display device, and the adjusting section generates color difference adjusted image data based on the adjusted image data and the color conversion table.

A color difference adjusted image display system according to the present invention includes the above-described adjusted image data generating device and a display device. The display device displays the object image based on the color difference adjusted image data.

An adjusted image data generation method according to the present embodiment includes: storing color reference data of a color reference; and generating adjusted image data by adjusting an object image for image data representing a color reference image and the object image so that color data of the color reference image matches the color reference data. The color reference image being an image of the color reference, the object image is an image of an object.

The adjusted image data generation method further includes deleting a part of the color reference image from the adjusted image data.

In an embodiment, in the generating adjusted image data, a difference between the color reference data and the color data is acquired.

In an embodiment, in the generating adjusted image data, a color reference adjustment table is generated based on the color reference data and the color data. The adjusted image data generation method further includes generating adjusted image data by adjusting image data representing an additional object image based on the color reference adjustment table. The additional object image is an image of an additional object An adjusted image data generation program according to the present invention cause a computer to execute: receiving image data representing a color reference image and an object image, the color reference image being an image of a color reference, the object image being an image of an object; and generating adjusted image data by adjusting the object image of the image data so that color data of the color reference image matches color reference data of the color reference image.

A color difference adjusted image display method according to the present invention includes: generating adjusted image data in an adjusted image data generating device according to the above-described adjusted image data generation method; generating a color conversion table used for color signal conversion between the adjusted image data generating device and a display device; generating color difference adjusted image data based on the adjusted image data and the color conversion table; and transmitting the color difference adjusted image data to the display device.

In one embodiment, in the generating color difference adjusted image data, the color difference adjusted image data includes the adjusted image data and the color conversion table.

A color difference adjusted data generating device according to the present invention includes storage and an adjusting section. The storage stores therein a color reference adjustment table indicating a relationship between color reference data of a color reference and color data of image data representing a color reference image that is an image of the color reference. The adjusting section generates adjusted image data based on image data representing an image of an object, the adjusted image data being image data in which the image of the object has been adjusted according to the color reference adjustment table.

An adjusted image data generation method according to the present invention includes: acquiring a color reference adjustment table indicating a relationship between color reference data of a color reference and color data of image data representing a color reference image that is an image of the color reference; and generating adjusted image data based on image data representing an image of an object, the adjusted image data being image data in which the image of the object has been adjusted according to the color reference adjustment table.

ADVANTAGEOUS EFFECTS OF INVENTION

According to the present invention, adjusted image data that can exhibit the color of an object with high reproducibility can be generated.

DESCRIPTION OF EMBODIMENTS

Figure 1:
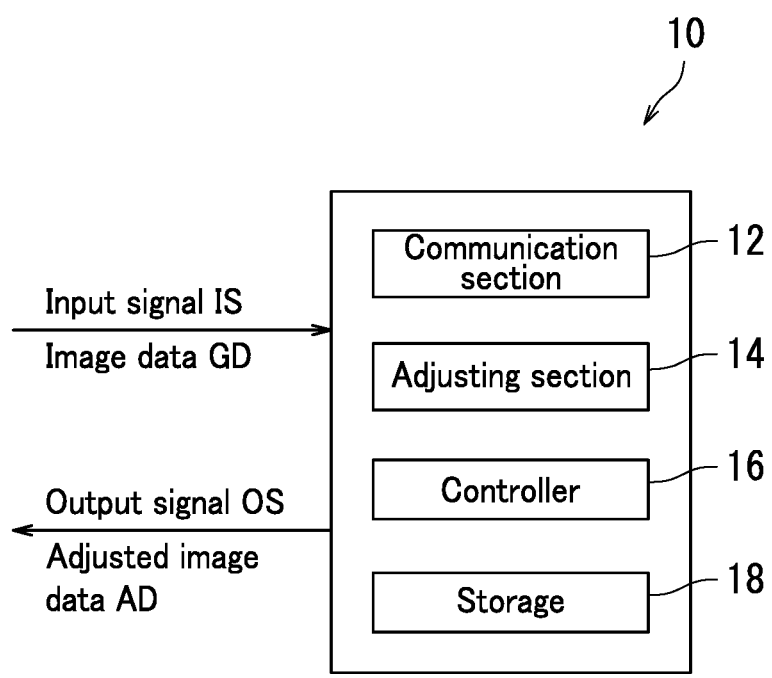
FIG. 1 is a schematic diagram of an adjusted image data generating device according to an embodiment.

The following describes an embodiment of the present invention with reference to the accompanying drawings. Note that elements that are the same or equivalent are indicated by the same reference signs in the drawings and description thereof is not repeated.

An embodiment of an adjusted image data generating device 10 according to the present invention is described below with reference to FIG. 1. FIG. 1 is a schematic block diagram of the adjusted image data generating device 10 of the present embodiment. Note that in the following description, an adjusted image data generating device and the adjusted image data generating device 10 may be also referred to below simply as data generating device and data generating device 10, respectively.

The data generating device 10 receives an input signal IS. For example, the data generating device 10 receives the input signal IS from an external device. The input signal IS includes image data GD. The image data GD represents an object image that is an image of an object and a color reference image that is an image of a color reference. Note that later-described image data GD may represent only the object image that is an image of the object. Alternatively, it is possible that image data GD represents the color reference image that is an image of the color reference while another image data GD represents the object image that is an image of the object.

Typically, the image data GD is generated by capturing an image of an object and a color reference using an imaging device. The imaging device may be a digital video camera. Alternatively, the imaging device may be a smartphone, a mobile phone, or a tablet computer having an image capturing function.

The image data GD is in a format of the joint photographic experts group (JPEG), for example. However, the format of the image data GD is not limited to the above. The image data GD may be in a format of the tagged image file (TIFF). Alternatively, the image data GD may be in any other format.

The color reference indicates at least one specific color. The color reference may indicate a plurality of specific colors. For example, the color reference is a fixture with one or more specific colors fixed. Alternatively, the color reference may be a display device that displays one or more specific colors. In one example, the display device may be a smartphone, a mobile phone, or a tablet computer. Alternatively, the display device may be a display of a personal computer. In one example, the display device may be a monitor of a laptop or desktop computer. Alternatively, the color reference may be printed matter.

The data generating device 10 generates adjusted image data AD based on the image data GD of the input signal IS. For example, the data generating device 10 transmits an output signal OS including the adjusted image data AD to an external device. Note that the destination of the adjusted image data AD may be the same as or different from the transmission source of the input signal IS.

In a manner as above, the data generating device 10 generates the adjusted image data AD based on the image data GD of the input signal IS. The data generating device 10 is a server, for example.

The data generating device 10 includes a communication section 12, an adjusting section 14, a controller 16, and storage 18. The controller 16 controls the communication section 12 and the adjusting section 14. The controller 16 includes a processor. The processor may include a central processing unit (CPU). Alternatively, the processor may include a microcomputer. Alternatively, the processor may include an application specific integrated circuit (ASIC). Note that the data generating device 10 may be included in a server. For example, the data generating device 10 may function through execution of a program stored in a server.

The communication section 12 communicates with an external communication device. Here, the communication section 12 receives the input signal IS including the image data GD from the external communication device. Furthermore, the communication section 12 may transmit the output signal OS including the adjusted image data AD to the external communication device. The communication section 12 may transmit an output signal OS including the adjusted image data AD and additional data to the external communication device.

The adjusting section 14 generates the adjusted image data AD based on the image data GD of the input signal IS. The adjusting section 14 generates the adjusted image data AD by adjusting the image data GD so that the color of the object image represented by the image data GD of the input signal IS displayed with the color of the object exhibited.

The adjusting section 14 adjusts the image data GD of the input signal IS to the adjusted image data AD. Through adjustment, the adjusted image data AD is adjusted so that the color of the color reference image represented by the adjusted image data AD exhibits the color of the color reference itself different from the color of the color reference image represented by the image data GD. Through adjustment as above, the color of the object image represented by the adjusted image data AD is adjusted to be different from the color of the object image represented by the image data GD.

Furthermore, the adjusting section 14 may further generate additional image data based on the adjusted image data AD and additional data.

The storage 18 includes a main storage device and an auxiliary storage device. The main storage device is semiconductor memory, for example. The auxiliary storage device is semiconductor memory and/or a hard disk drive, for example. The storage 18 may include a removable medium.

The storage 18 stores color reference data of the color reference therein. The color reference data includes a color signal. For example, the color signal is expressed in the RGB color space. Alternatively, the color signal is expressed in the Lab color space.

The storage 18 stores a control program therein. The control program is stored in a non-transitory computer-readable recording medium. The non-transitory computer-readable recording medium includes read-only memory (ROM), random-access memory (RAM), CD-ROM, a magnetic tape, a magnetic disk, or an optical data storage device. The controller 16 executes the control program stored in the storage 18 to control operation of each element of the data generating device 10. The controller 16 executes a computer program stored in the storage 18 to generate the adjusted image data AD from the image data GD.

For example, the storage 18 may store a color conversion table therein. The color conversion table is a table used for converting color data of the image data GD to color data of the adjusted image data AD. The adjusting section 14 may generate the adjusted image data AD based on the image data GD according to the color conversion table stored in the storage 18.

Alternatively, the storage 18 may store an arithmetic expression therein. The arithmetic expression is an expression for converting the color data of the image data GD to the color data of the adjusted image data AD. The adjusting section 14 may generate the adjusted image data AD based on the image data GD using the arithmetic expression stored in the storage 18. Alternatively, it is possible that the storage 18 stores the color conversion table and the arithmetic expression therein and the adjusting section 14 generates the adjusted image data AD based on the image data GD using the color conversion table and the arithmetic expression stored in the storage 18.

Furthermore, the storage 18 may store therein an adjusted image data generation program for generating the adjusted image data AD in which the image data GD has been adjusted. For example, the adjusting section 14 may be embodied by execution of an adjusted image data generation program 10s.

In the data generating device 10 of the present embodiment, the adjusting section 14 generates the adjusted image data AD in which the object image represented by image data GD has been adjusted so that color data of the color reference image matches the color reference data. Here, the image data GD represents the color reference image that is an image of the color reference and the object image is an image of the object. As such, generation of the adjusted image data AD that can exhibit the color of the object with high reproducibility can be achieved. Furthermore, in the data generating device 10 of the present embodiment, even when the object is not at hand, the adjusted image data AD with the color of the object image adjusted can be generated based on the image data GD including the object image using the color reference data.

Figure 2:
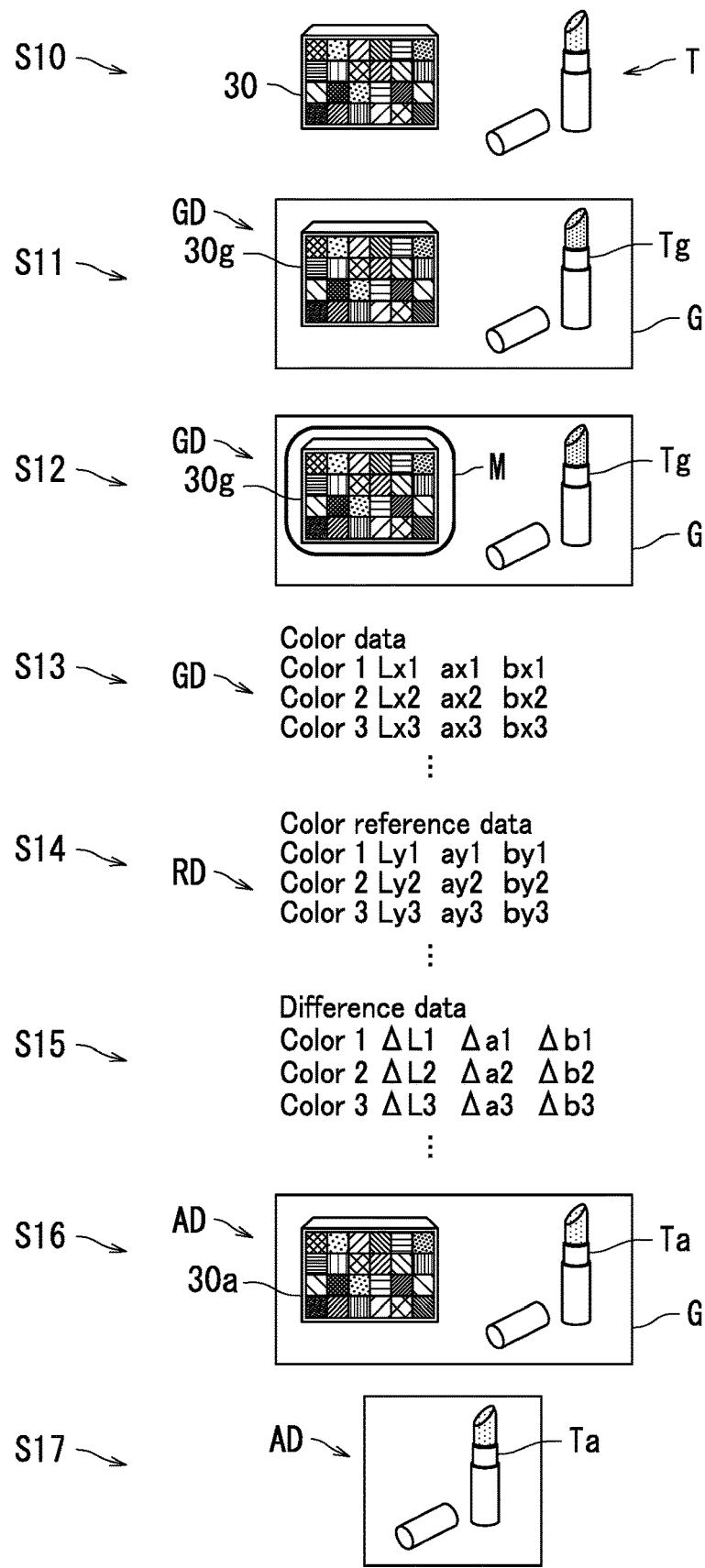
FIG. 2 is a schematic diagram explaining a flow of an adjusted image data generation method implemented by the adjusted image data generating device of the embodiment.

With reference to FIGS. 1 and 2, an adjusted image data generation method implemented by the data generating device 10 of the present embodiment is described next. FIG. 2 is a flow diagram explaining a flow of the adjusted image data generation method implemented by the data generating device 10 of the present embodiment.

Image data GD is generated in Step S10 in FIG. 2 prior to the communication section 12 of the data generating device 10 receiving an input signal IS including the image data GD in Step S11. The image data GD is generated by capturing an image of an object T and a color reference 30 using an imaging device. The image data GD represents an image G including an object image Tg that is an image of the object T and a color reference image 30g that is an image of the color reference 30. The color coordinates of the color reference 30 measured in measurement of the color reference 30 under specific conditions are defined in advance. The color reference 30 is used as a reference in adjustment of color difference between the color of the object T and the color of the object image Tg.

Here, the object T is a lipstick and a lipstick container and the color reference 30 is a color chart indicating mutually different 24 color swatches. The color swatches of the color chart are arranged in a matrix of 4 rows by 6 columns. Here, of the color swathes of the color chart, the swatches in the left first row are "Color 1", the swatches in the left second row are "Color 2", and the swatches in the left third row are "Color 3".

Note that the appearance of the color chart is substantially rectangular parallelepiped in shape and the shape of the color chart when viewed in front is substantially rectangular. Furthermore, the color swatches are arranged in a matrix of 4 rows by 6 columns. However, the present embodiment is not limited to this. The shape and color of the color chart may arbitrary and the arrangement and the number of the color swatches of the color chart may be arbitrary. For example, the shape of the color chart when viewed in front may be substantially circular. Alternatively or additionally, the number of the color swatches may be greater than or smaller than 24.

The colors of the color swatches of the color reference 30 may be defined generally regardless of the object T. In this case, the colors of the color swatches preferably include a plurality of colors with significantly different color coordinates. Typically, the colors of the color swatches include at least any of red, green, blue, black, white, and gold and silver. More preferably, the colors of the color swatches include at least any of red, green, blue, black, white, gold, silver, cyan, and magenta and yellow.

Alternatively, the colors of the color swatches of the color reference 30 may be determined according to the object T. For example, a color with color coordinates close to those of the color of the object T is used as a color of one of the color swatches. In this case, a plurality of colors with color cardinalates close to those of the color of the object T are preferably used as the colors of the color swatches. For example, differences ΔL, Aa, and Ab between the color coordinates of the color of each color swatch and the color coordinates of the color of the object T are preferably no greater than 0.5. In one example, where the object T is a white cutter shirt, the color of a color swatch may be white.

Thereafter in Step S11, the data generating device 10 receives the image data GD. The image data GD represents an image G including an object image Tg that is an image of the object T and a color reference image 30g that is an image of the color reference 30.

In Step S12, the color reference image 30g within an extraction range M is cut out from the image G represented by the image data GD. The data generating device 10 may perform such processing with the object image Tg and the color reference image 30g displayed based on the image data GD. The adjusting section 14 assigns the extraction range M to the color reference image 30g of the image G and cuts out the color reference image 30g within the extraction range M.

For example, it is possible that a specific reference color included in the color reference 30 and color arrangement therearound are preset and the adjusting section 14 specifies the color reference image 30g from the image G represented by the image data GD by investigating the specific reference color and the color arrangement therearound in the image G represented by the image data GD. Through the above, the adjusting section 14 specifies the color reference image 30g from the image G represented by the image data GD. For example, the reference color is white.

Note that the color reference image 30g faces in front of the image G herein but the present embodiment is not limited to this. The color reference image 30g may faces aslant or be inverted.

In Step S13, color date of the cut-out color reference image 30g is acquired. The adjusting section 14 acquires the color date of the color reference image 30g. The color data may be acquired by measuring the color reference image 30g. Alternatively, the color data may be acquired based on a color signal indicating image data representing the color reference image 30g.

For example, the color data is expressed in the Lab color space. Here, color data of "Color 1" is expressed by (Lx1, ax1, bx1), color data of "Color 2" is expressed by (Lx2, ax2, bx2), and color data of "Color 3" is expressed by (Lx3, ax3, bx3).

In Step S14, color reference data of the color reference 30 is read out. The adjusting section 14 reads out the color reference data of the color reference from the storage 18. For example, the color reference data is expressed in the Lab color space.

Here, color reference data of "Color 1" is expressed by (Ly1, ay1, by1), color reference data of "Color 2" is expressed by (Ly2, ay2, by2), and color reference data pf "Color 3" is expressed by (Ly3, ay3, by3).

In Step S15, the adjusting section 14 compares the color data acquired for the color reference with the color reference data. For example, the adjusting section 14 acquires a difference between color reference data RD and the color data acquired for the color reference. Here, a difference as to "Color 1" is (ΔL1, Δa1, Δb1). ΔL1 is a difference between Lx1 and Ly1, Δa1 is a difference between ax1 and ay1, and Δb1 is a difference between bx1 and by1. Similarly, a difference as to "Color 2" is (ΔL2, Δa2, Δb2), and a difference as to "Color 3" is (ΔL3, Δa3, Δb3).

Note that the adjusting section 14 may acquire a ratio between the color reference data RD and the color data acquired for the color reference 30. In this case, a ratio as to "Color 1" is (Lx1/Ly1, ax1/ay1, bx1/by1). Similarly, a ratio as to "Color 2" is (Lx2/Ly2, ax2/ay2, bx2/by2) and a ratio as to "Color 3" is (Lx3/Ly3, ax3/ay3, bx3/by3).

Furthermore, it is possible that the adjusting section 14 generates a color reference adjustment table based on the color reference data RD and the color data acquired from the image data GD representing the color reference image 30g of the color reference 30 and the storage 18 stores the color reference adjustment table as the color conversion table. The color data of the color reference image 30g can be adjusted to the color reference data RD using the color reference adjustment table.

In Step S16, the adjusting section 14 converts the image data GD to the adjusted image data AD based on a result of comparison. Through conversion, the color reference image 30g is converted to a color reference image 30a and the object image Tg is converted to an object image Ta.

For example, when the adjusting section 14 acquires a difference between the color reference data RD and the color data acquired for the color reference, the adjusting section 14 changes the values of the color data of the image data GD so that the difference is eliminated. Alternatively, when the adjusting section 14 acquires a ratio between the color reference data RD and the color data acquired for the color reference, the adjusting section 14 changes the values of the color data of the image data GD so that the ratio becomes 1. Conversion may be performed through linear interpolation. Alternatively, conversion may be performed through polynomial interpolation.

The adjusted image data AD represents an image G including the object image Ta that is an image of the object T and the color reference image 30a that is an image of the color reference 30. For example, the adjusting section 14 converts the image data GD to the adjusted image data AD based on the difference between the color reference data RD and the color data acquired for the color reference.

The adjusting section 14 converts the image data GD to the adjusted image data AD so that the color reference image 30g changes to the color reference image 30a. The color of the color reference image 30a exhibits the color of the color reference 30. When the adjusting section 14 converts the image data GD to the adjusted image data AD, the object image Tg changes to the object image Ta. Through conversion as above, a color difference between the color of the object T and the color of the object image Ta can be corrected.

In Step S17, the adjusting section 14 deletes a part of the adjusted image data AD corresponding to the color reference image 30a from the adjusted image data AD to make the adjusted image data AD correspond to the object image Ta. Thereafter, the communication section 12 transmits an output signal OS including the adjusted image data AD to an external device. For example, the communication section 12 transmits the output signal OS to a transmitter that is a transmission source of the input signal. In the manner described above, the adjusted image data AD is generated. According to the present embodiment, the adjusted image data AD can be generated that enables display of the object image Ta exhibiting the color of the object T with high reproducibility.

Note that difference data is obtained from the data expressed in the Lab color space in Steps S13 to S17 in FIG. 2, which should not be taken to limit the present embodiment. The difference data may be obtained from data expressed in the RGB color space.

Figure 3:
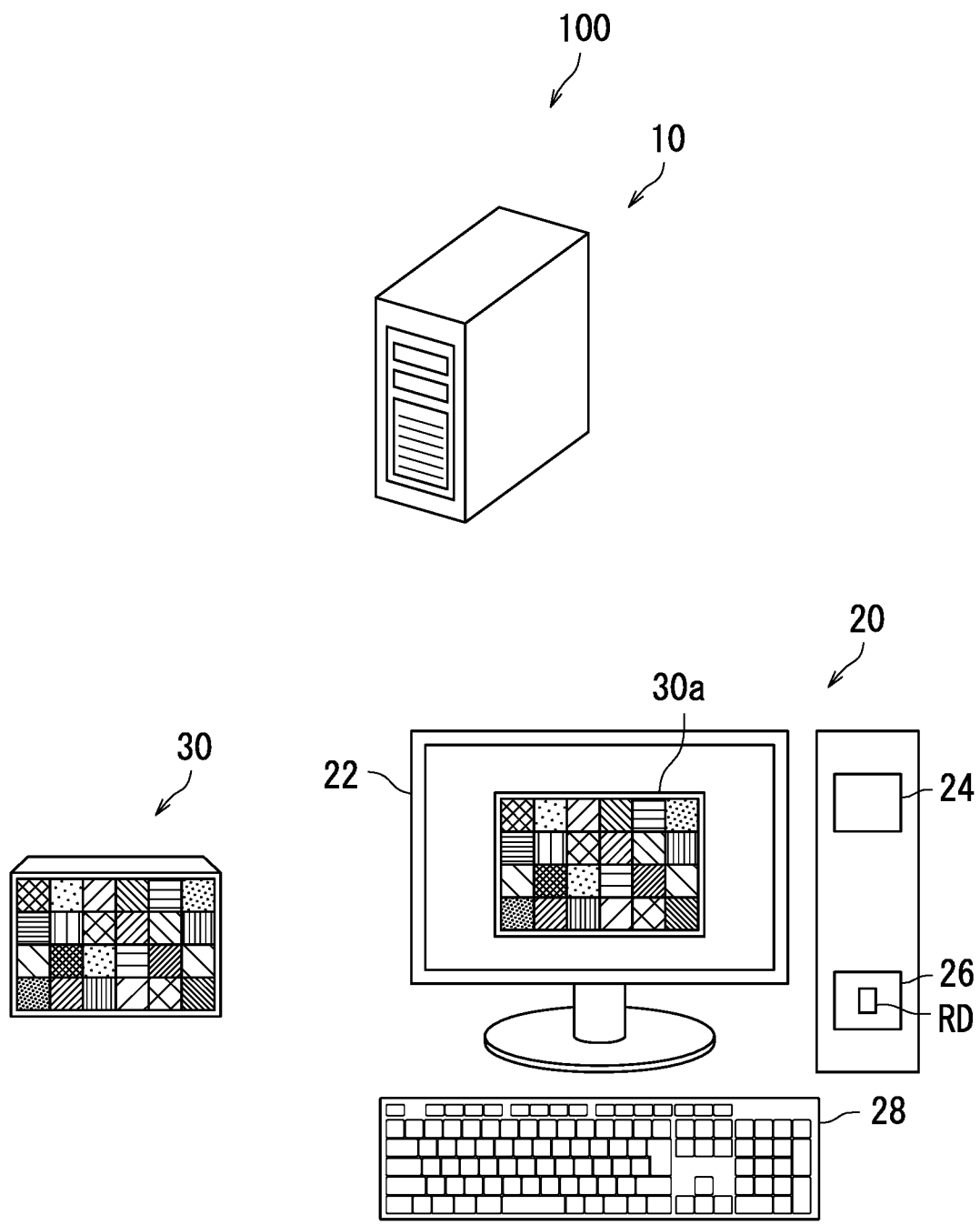
FIG. 3 is a schematic diagram of an adjusted image data generation system according to the embodiment.

The data generating device 10 of the present embodiment can be favorably used in an adjusted image data generating system. With reference to FIGS. 1 to 3, an adjusted image data generation system 100 according to the present embodiment is described next. FIG. 3 is a schematic diagram of the adjusted image data generation system 100.

The adjusted image data generation system 100 includes the data generating device 10, a display device 20, and a color reference 30. As described previously, the data generating device 10 generates the adjusted image data AD based on the image data GD of the input signal IS.

The display device 20 displays the color reference image 30a based on the color reference data RD. The display device 20 displays the color reference image 30a exhibiting the color of the color reference 30 according to the color reference data RD. The color reference data RD is adjusted so as to enable display of the color reference image 30a exhibiting the color of the color reference 30 by the display device 20. Note that the color reference data RD may be the same as that stored in the storage 18 of the data generating device 10.

The display device 20 includes a monitor 22, a controller 24, storage 26, and an input section 28. The controller 24 controls the monitor 22 and the input section 28.

The monitor 22 displays an image. The storage 26 stores the color reference data RD therein. The color reference data RD is data adjusted so as to enable display of the color reference image 30a exhibiting the color of the color reference 30 when displayed by the monitor 22.

The controller 24 controls the monitor 22 to display the color reference image 30a according to the color reference data RD stored in the storage 26. In this case, the monitor 22 displays the color reference image 30a according to the color reference data RD.

The input section 28 inputs information for adjusting the color reference data stored in the storage 26. The input section 28 may include a keyboard. Alternatively, the input section 28 may include a touch sensor integrally provided with the monitor 22.

A user is allowed to input information for adjusting the color reference data through the input section 28. The storage 26 stores therein color reference data RD that has been adjusted. As such, the monitor 22 displays the color reference image 30a according to the color reference data RD.

Figure 4:
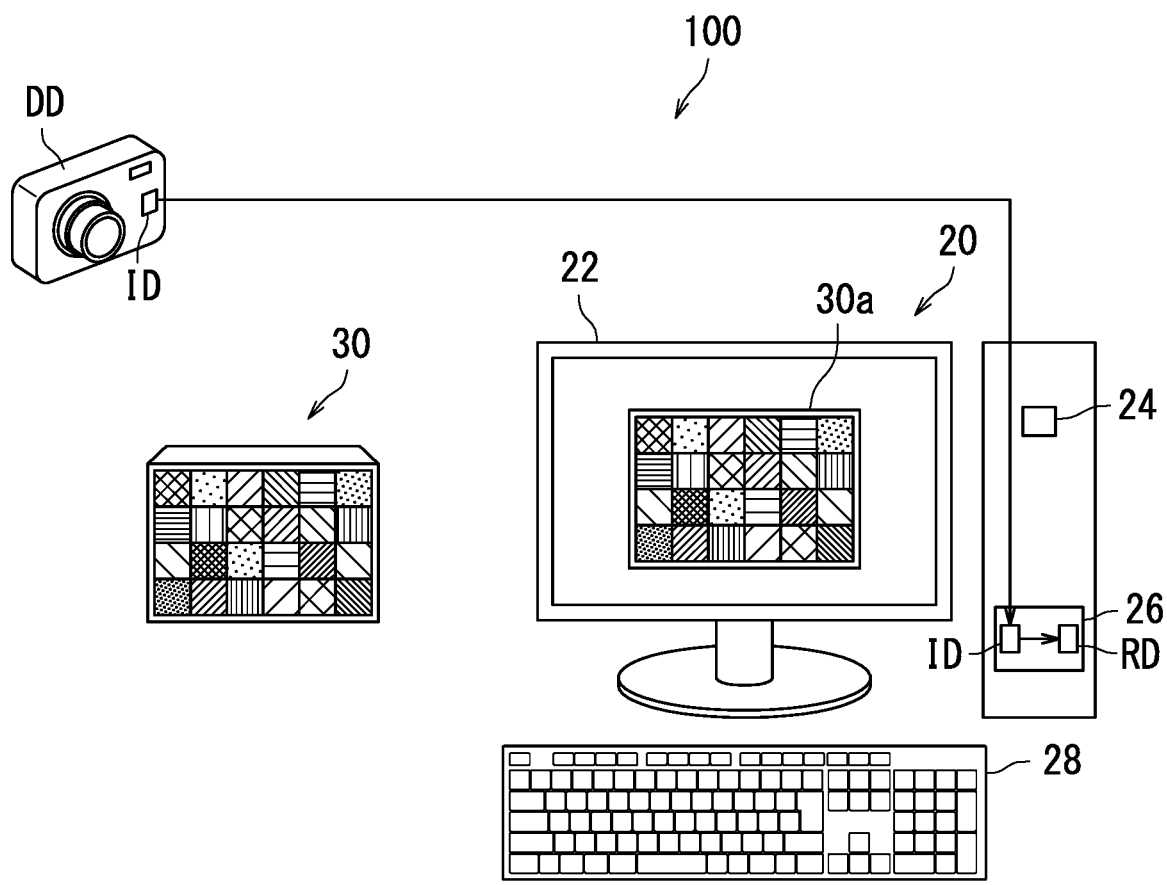
FIG. 4 is a schematic diagram explaining generation of color reference data in the adjusted image data generation system of the embodiment.

With reference to FIGS. 1 to 6, an adjusted image data generation method implemented by the adjusted image data generation system 100 of the present embodiment is described next. FIG. 4 is a schematic diagram explaining adjustment of color reference data in the display device 20.

As described previously, the display device 20 displays the color reference image 30a exhibiting the color of the color reference 30 based on the color reference data RD. The color reference data RD is adjusted so as to enable display of the color reference image 30a exhibiting the color of the color reference 30 by the monitor 22.

First, an imaging device DD captures an image of a color reference 30 to generate image-capture color data ID. Although the image-capture color data II) is data obtained by capturing an image of the color reference 30, the color of the color reference image may differ from the color of the color reference 30 when the image-capture color data ID is displayed. As such, the image-capture color data ID is adjusted in the display device 20.

Information for adjusting the image-capture color data ID stored in the storage 26 is input to the input section 28. The user is allowed to input the information for adjusting the image-capture color data ID through the input section 28. Through adjustment of the image-capture color data ID, the color of the image of the color reference 30 displayed by the monitor 22 can exhibit the color of the color reference 30. The storage 26 stores the color reference data RD generated by adjusting the image-capture color data ID. The monitor 22 displays the color reference image 30a according to the color reference data RD.

Figure 5:
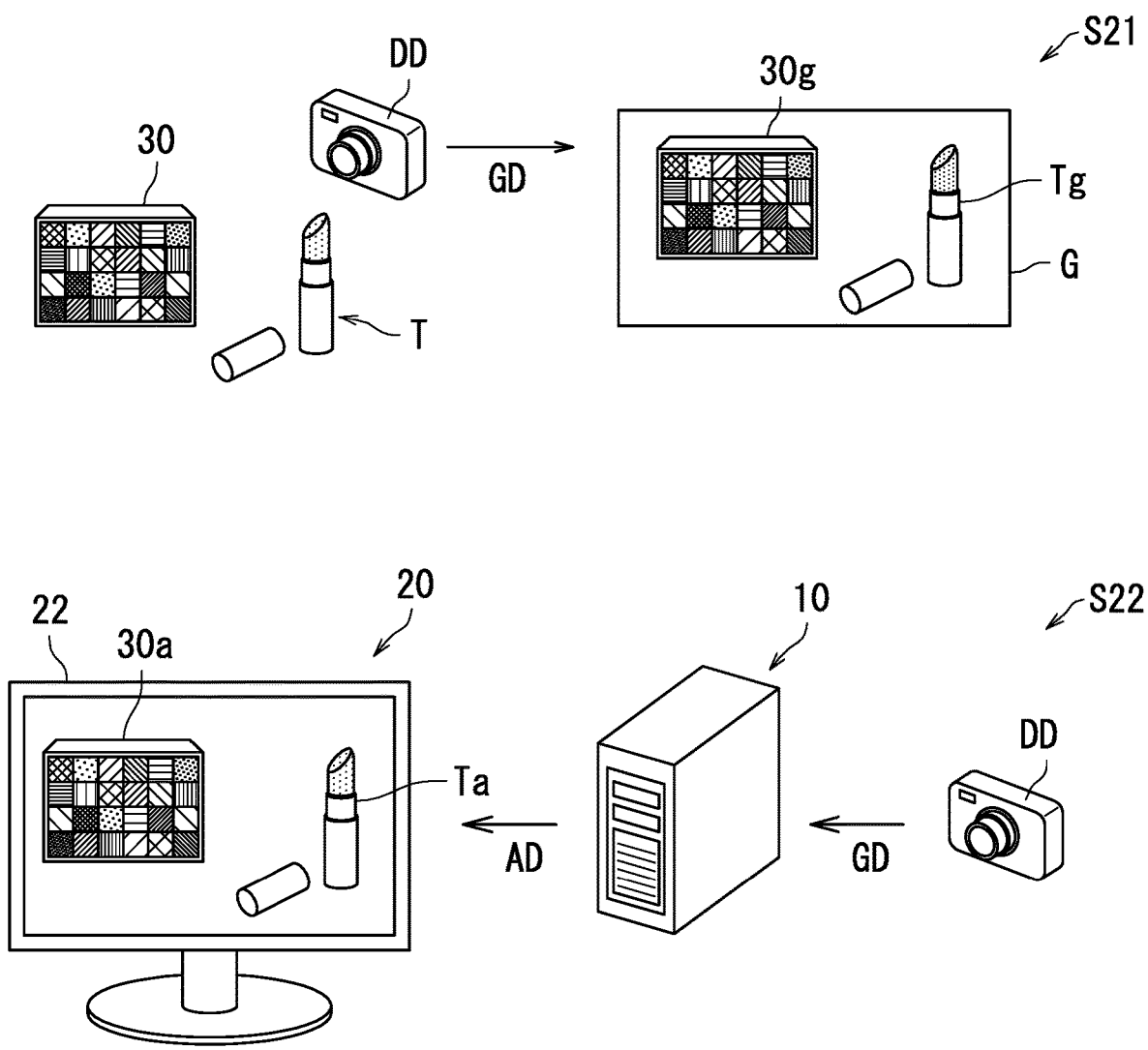
FIG. 5 is a schematic diagram explaining a flow of an adjusted image data generation method implemented by the adjusted image data generation system of the embodiment.

With reference to FIGS. 4 to 5, an adjusted image data generation method implemented by the adjusted image data generation system 100 of the present embodiment is described next. FIG. 5 is a flow diagram explaining the adjusted image data generation method implemented by the adjusted image data generation system 100.

As depicted in Step S21, image data GD is generated by capturing an image of an object T and a color reference 30 using an imaging device DD. The image data GD represents an image G including an object image Tg and a color reference image 30g.

As depicted in Step S22, the data generating device 10 receives an input signal including the image data GD and generates adjusted image data AD based on the image data GD. In detail, the data generating device 10 generates the adjusted image data AD based on the image data GD in a manner as described with reference to FIG. 2. The adjusted image data AD represents an object image Ta in which color difference with the object image Tg has been adjusted and a color reference image 30a in which color difference with the color reference image 30g has been adjusted.

When the display device 20 displays an image according to the adjusted image data AD in a manner as above, the color of the object image Ta represented by the adjusted image data AD can exhibit the color of the object T with high accuracy. Note that although it is ideal that the color of the object image Ta represented by the adjusted image data AD is equal to the color of the object T in FIG. 5, this does not mean that the color of the object image Ta is exactly the same as the color of the object T. That is, the color difference between the color of the object image Ta and the color of the object T does not have to be exactly zero.

The display device 20 is used for adjustment of the color reference data RD of the color reference 30 and displays the object image Ta according to the adjusted image data AD in the above description with reference to FIGS. 1 to 5, which should not be taken to limit the present embodiment. The adjusted image data AD may be displayed by a display device other than the display device 20.

Figure 6:
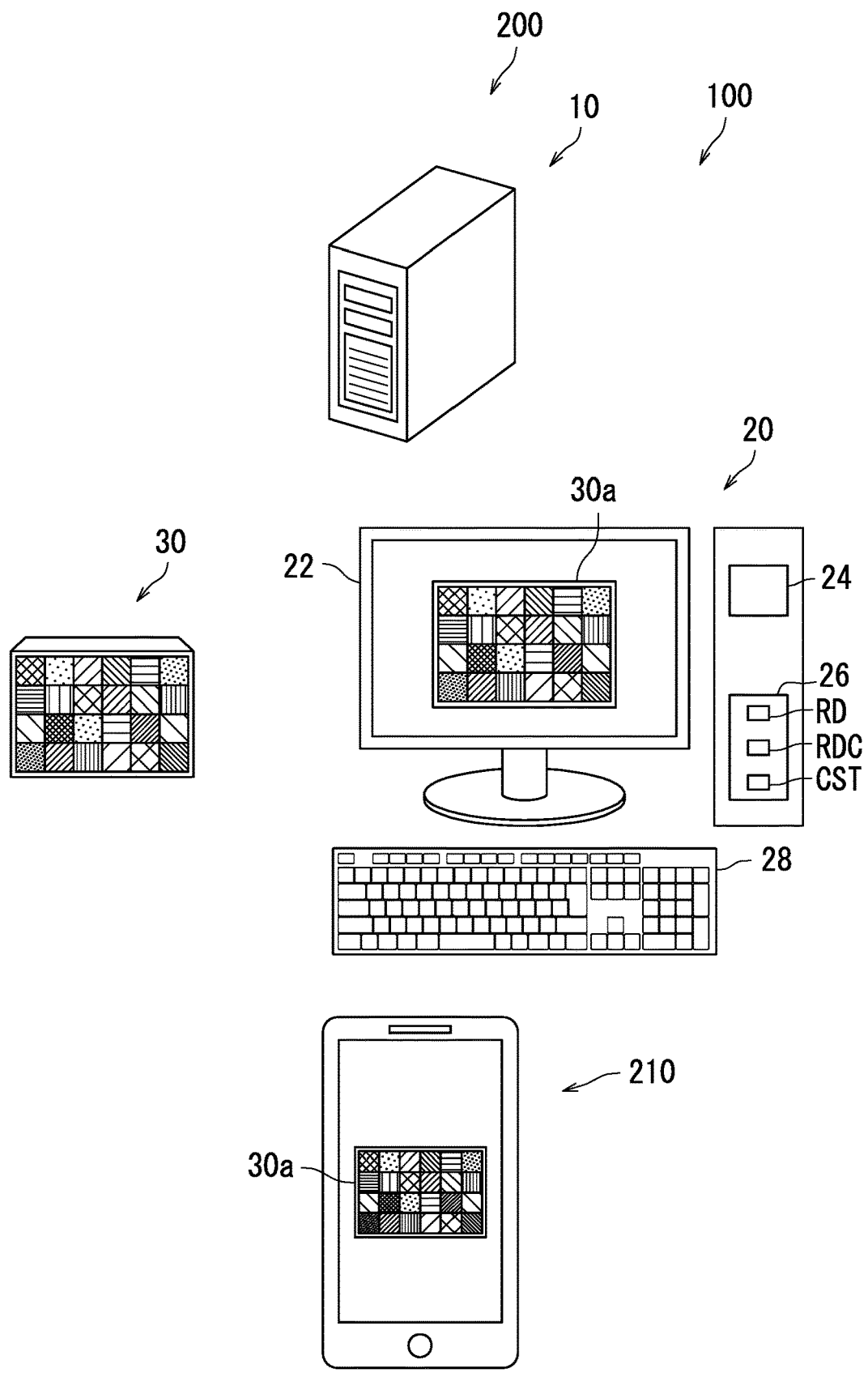
FIG. 6 is a schematic diagram of a color difference adjusted image display system according to the embodiment.
Figure 7:
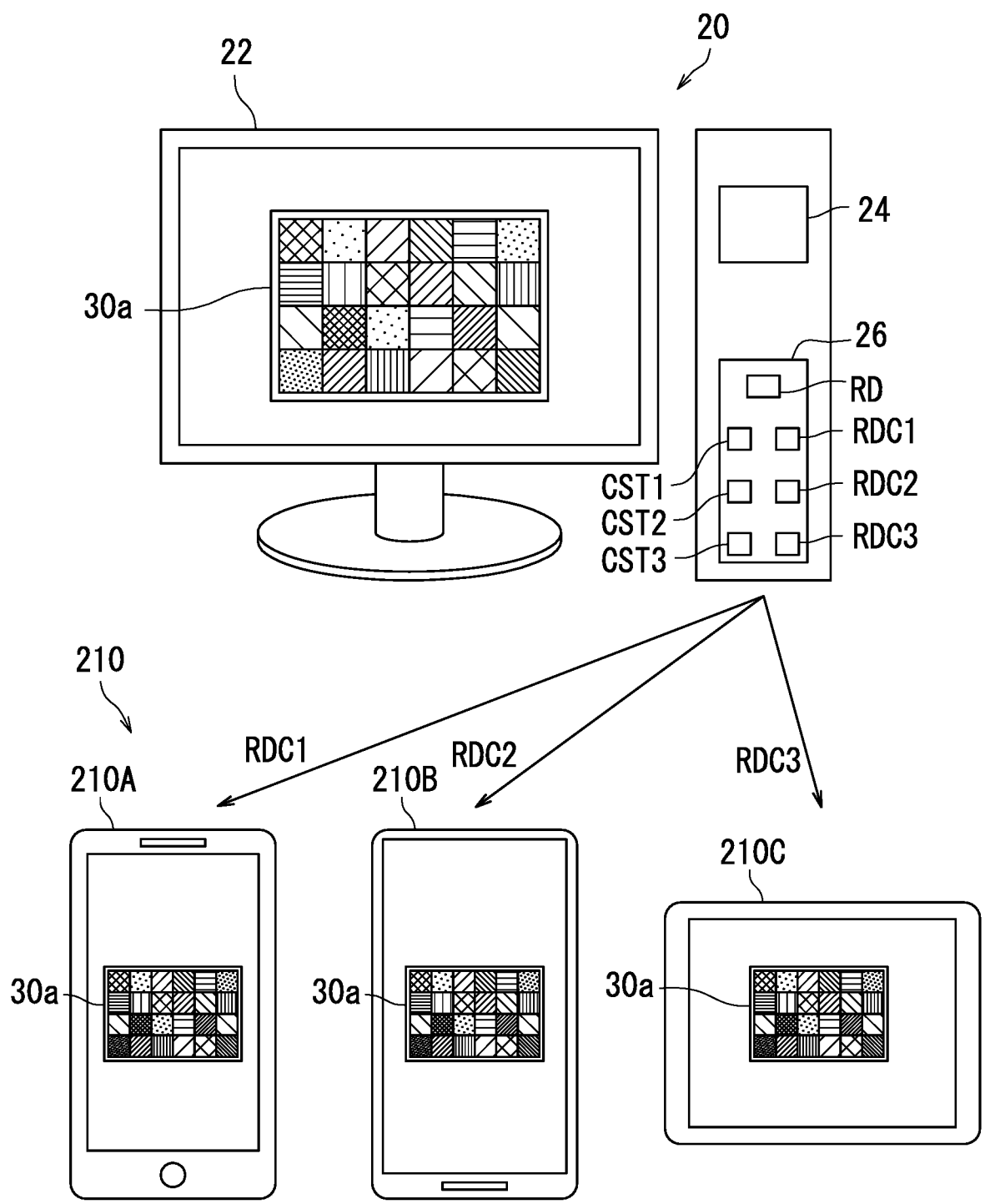
FIG. 7 is a schematic diagram explaining color difference adjustment in a display device of the color difference adjusted image display system of the embodiment.
Figure 8:
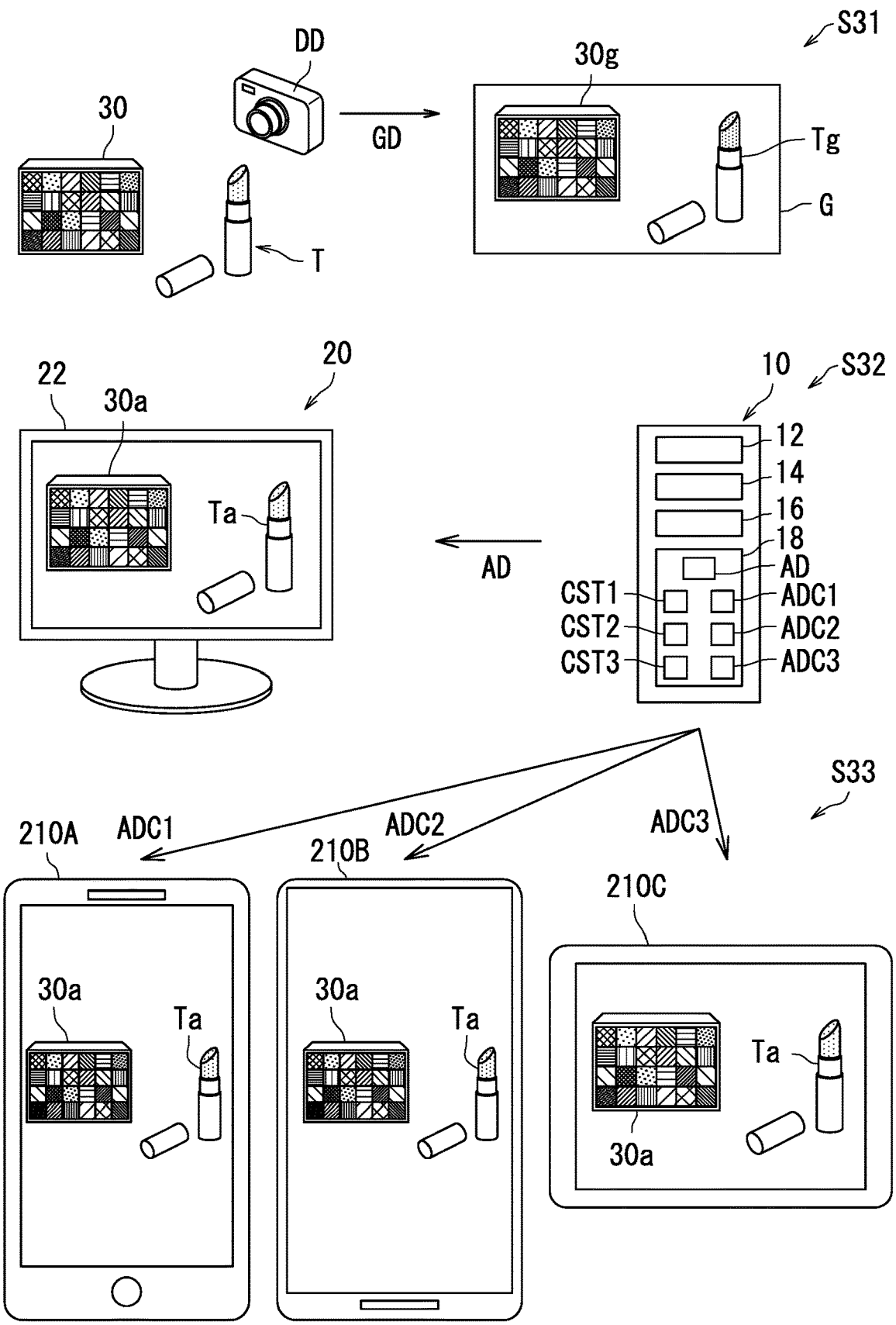
FIG. 8 is a schematic diagram explaining a flow of a color difference adjusted image display method implemented by the color difference adjusted image display system of the embodiment.

The data generating device 10 and the adjusted image data generation system 100 described previously with reference to FIGS. 1 to 5 are favorably used in a color difference adjusted image display system. With reference to FIGS. 6 to 8, a color difference adjusted image data display system 200 according to the present embodiment is described next. FIG. 6 is a schematic diagram of the color difference adjusted image data display system 200. Note that an adjusted image data generation system 100 included in the color difference adjusted image display system 200 is the same as the adjusted image data generation system 100 described with reference to FIGS. 3 to 5, and therefore duplicate description is omitted for avoiding redundancy.

The color difference adjusted image display system 200 includes the adjusted image data generation system 100 and a display device 210. Here, the display device 20 displays a color reference image 30a according to color reference data RD. By contrast, the display device 210 displays the color reference image 30a in a manner similar to that in the display device 20.

Note that the color characteristics of the display device 210 differ from the color characteristics of the display device 20, and therefore the display device 210 performing display according to the color reference data RD cannot display the same color reference image 30a as that displayed by the display device 20. As such, the color difference adjusted image display system 200 uses a color conversion table CST.

The storage 26 stores a color conversion table CST therein. The color conversion table CST is used for color signal conversion between the display device 20 and the display device 210. With use of the color conversion table CST, conversion between a color signal of the display device 20 and a color signal of the display device 210 is enabled.

For example, the color conversion table CST can be generated by measuring the colors of images that the display device 20 and the display device 210 displays according to the same data. In one example, the monitor 22 of the display device 20 displays an image according to reference color signal data including a plurality of mutually different color signals and a colorimeter measures the attributes of the colors displayed by the monitor 22. The color attributes include chromaticity coordinates (X, Y) and lightness Ev, for example. Similarly, the display device 210 displays an image according to the reference color signal data including the plurality of mutually different color signals and a colorimeter measures the attributes of the colors displayed by the display device 210. Note that the reference color signal data displayed by the display device 20 is the same as the reference color signal data displayed by the display device 210.

Even in display according to the same reference color signal data, the color displayed by the monitor 22 differs from the color displayed by the display device 210. For example, it is supposed that the lightness and the chromaticity coordinates of a color displayed by the monitor 22 is expressed by (Ev, X, Y)=(15.0, 0.55, 0.30) and the lightness and the chromaticity coordinates of the color displayed by the display device 210 is expressed by (Ev, X, Y)=(15.0, 0.60, 0.30) when a color signal of the reference color signal data is expressed by (R, G, B)=(255, 0, 0). It is further supposed that the lightness and the chromaticity coordinates of a color displayed by the monitor 22 is expressed by (Ev, X, Y)=(15.0, 0.50, 0.30) and the lightness and the chromaticity coordinates of the color displayed by the display device 210 is expressed by (Ev, X, Y)=(15.0, 0.55, 0.30) when a color signal of the reference color signal data is expressed by (R, G, B)=(240, 0, 0).

In this case, the color with the same lightness and chromaticity coordinates (Ev, X, Y)=(15.0, 0.55, 0.30) can be displayed by the monitor 22 and the display device 210 when a color signal in the monitor 22 is expressed by (R, G, B)=(255, 0, 0) and a color single in the display device 210 is expressed by (R, E B)=(240, 0, 0). As such, the color signal (R, E B)=(255, 0, 0) in the display device 20 corresponds to the color signal (R, G, B)=(240, 0, 0) in the display device 210. In this case, the color conversion table CST includes a table for converting the color signal (R, G, B)=(255, 0, 0) in the display device 20 to the color signal (R, G, B)=(240, 0, 0) in the display device 210.

Similarly, it is supposed that when a color signal of the reference color signal data is expressed by (R, G, B)=(0, 255, 0), the lightness and the chromaticity coordinates of a color displayed by the monitor 22 is expressed by (Ev, X, Y)=(22.0, 0.15, 0.65) and the lightness and the chromaticity coordinates of the color displayed by the display device 210 is expressed by (Ev, X, Y)=(22.0, 0.15, 0.70). It is further supposed that when another color signal of the reference color signal data is expressed by (R, G, B)=(0, 240, 0), the lightness and the chromaticity coordinates of a color displayed by the monitor 22 is expressed by (Ev, X, Y)=(22.0, 0.15, 0.60) and the lightness and the chromaticity coordinates of the color displayed by the display device 210 is expressed by (Ev, X, Y)=(22.0, 0.15, 0.65).

In this case, the color with the same lightness and chromaticity coordinates (Ev, X, Y)=(22.0, 0.15, 0.65) can be displayed by the monitor 22 and the display device 210 when the color signal in the monitor 22 is expressed by (R, G, B)=(0, 255, 0) and the color signal in the display device 210 is expressed by (R, G, B)=(0, 240, 0). As such, the color signal (R, G, B)=(0, 255, 0) in the display device 20 corresponds to the color signal (R, B)=(0, 240, 0) in the display device 210. In this case, the color conversion table CST includes a table for converting the color signal (R, B)=(0, 255, 0) in the display device 20 to the color signal (R, G, B)=(0, 240, 0) in the display device 210.

It should be noted that the above values are only examples to facilitate understanding of the present embodiment and are not actual values. Furthermore, the lightness and the chromaticity coordinates of the image corresponding to a given color signal in the display device 210 are equal to the lightness and chromaticity coordinates of the image corresponding to another color signal in the display device 20 in the above description, which should not be taken to limit the present embodiment. It is only required that the lightness and the chromaticity coordinates of the image corresponding to a given color signal in the display device 210 are close to the lightness and the chromaticity coordinates of the image corresponding to another color signal in the display device 20.

For example, the color difference ΔE between the color of the image corresponding to a given color signal in the display device 210 and the color of the image corresponding to another color signal in the display device 20 is preferably no greater than 6.0, more preferably no greater than 4.5, and further preferably no greater than 3.0. Alternatively, the color difference ΔE is still further preferably no greater than 1.5. Note that where the color difference is expressed by $\Delta E = \{(\Delta L^*)^2 + (\Delta a^*)^2 + (\Delta b^*)^2\}^{1/2}$ where $L^* = 116 \times f(Y/Y_n) - 16$, $a^* = 500 \times [f(X/X_n) - f(Y/Y_n)]$, and $b^* = 200 \times [f(Y/Y_n) - f(Z/Z_n)]$, and $f(t) = t^{1/3}$ is met when $t > (6/29)^3$ while $f(t) = [(29/3)^3 \times t + 16]/116$ is met when $t \leq (6/29)^3$. Furthermore, $X_n$, $Y_n$, and $Z_n$ are tristimulus values at a white point in the CIE XYZ color space.

As described above, the color conversion table CST can be generated by comparison between the color of the image corresponding to the color signal of the reference color signal data in the display device 20 and the color of the image corresponding to the color signal of the reference color signal data in the display device 210. Note that it is unnecessary to measure all colors of color signals of the image data in each of the display device 20 and the display device 210. Color signals to be measured should correspond to only about 1000 mutually different coolers.

The display device 20 generates color reference data RDC based on the color reference data RD and the color conversion table CST. The color reference data RDC is generated so as to suit to the display device 210. The display device 210 is enabled to display an image with color exhibiting the color of the color reference 30 according to the color reference data RDC.

The controller 24 generates the color reference data RDC based on the color reference data RD and the color conversion table CST. Use of the color conversion table CST can achieve reproduction of the color indicated by the color signal in the monitor 22 by the color indicated by the color signal in the display device 210. When the display device 210 displays an image through conversion of the color reference data RD stored in the storage 26 to a color signal according to the color conversion table CST, the color of the image displayed by the display device 210 can exhibit the color of the image displayed by the monitor 22. Note that the color conversion table CST is unique to the type of the display device 20 and the type of the display device 210. Therefore, another color conversion table is needed to be separately generated when a display device having different color characteristics is used for display.

The controller 24 generates the color reference data RDC based on the color reference data RD and the color conversion table CST. For example, the color reference data RDC includes the color reference data RD and the color conversion table CST. In one example, the color conversion table CST is used as a color profile in the display device 210. The color reference data RDC is generated by synthesizing the color reference data RD and the color conversion table CST.

The display device 210 receives the color reference data RDC generated by the display device 20. The display device 210 is enabled to display the color reference 30 with the color difference of the color reference 30 adjusted based on the color reference data RDC. As such, the display device 210 can display the color of the color reference image 30a with high reproducibility according to the color reference data RDC generated in the display device 20. Note that the color conversion table CST in the display device 20 is used also in the adjusted image data generating device 10.

Description is made next of adjustment of the color difference between the display device 20 and the display device 210 in the color difference adjusted image display system 200 of the present embodiment with reference to FIG. 7. FIG. 7 is a schematic diagram explaining adjustment of the color difference between the display device 20 and the display device 210 in the color difference adjusted image display system 200 of the present embodiment. Here, the display device 210 includes a first display device 210A, a second display device 210B, and a third display device 2100.

Here, the display device 20 displays the color reference image 30a according to the color reference data RD. By contrast, the first display device 210A, the second display device 210B, and the third display device 210C display the color reference image 30a likewise the display device 20.

Note that the color characteristics of the first display device 210A, the second display device 210B, and the third display device 2100 differ from the color characteristics of the display device 20, and therefore the first display device 210A, the second display device 210B, and the third display device 210C cannot display the same color reference image 30a as the display device 20 even when the same color reference data as the that of the display device 20 is transmitted to the first display device 210A, the second display device 210B, and the third display device 210C.

As such, the display device 20 generates color difference adjusted reference data based on the color reference data RD and the color conversion table. For example, the display device 20 generates color difference adjusted reference data RDC1 for the first display device 210A based on the color reference data RD and a color conversion table CST1 for the first display device 210A. Thereafter, the data generating device 10 outputs an output signal including the color difference adjusted reference data RDC1 to the first display device 210A. The first display device 210A displays an image representing the color reference image 30a based on the color difference adjusted reference data RDC1.

Similarly, the display device 20 generates color difference adjusted reference data RDC2 for the second display device 210B based on the color reference data RD and a color conversion table CST2 for the second display device 210B. Thereafter, the data generating device 10 outputs an output signal including the color difference adjusted reference data RDC2 to the second display device 210B. The second display device 210B displays an image representing the color reference image 30a based on the color difference adjusted reference data RDC2. Note that the same applies to the third display device 210C and description thereof is therefore omitted.

With reference to FIG. 8, a color difference adjusted image display method implemented by the color difference adjusted image display system 200 is described next. FIG. 8 is a flow diagram explaining the color difference adjusted image display method implemented by the color difference adjusted image display system 200.

As depicted in Step S31, the imaging device DD captures an image of an object T and a color reference 30 within the same image capture area first. Typically, the image of the object T and the color reference 30 are captured in a state in which the object T and the color reference 30 are arranged side by side so as not to overlap with each other.

Here, the imaging device DD generates image data GD by capturing the image of the object T and the color reference 30. The image data GD represents an image G including an object image Tg and a color reference image 30g. Note that although the image data GD represents the object image Tg and the color reference image 30g, the colors of the object image Tg and the color reference image 30g differ from those of the object T and the color reference 30. As such, even when an image represented by the image data GD is directly displayed by a display device, the colors of the object image Tg and the color reference image 30g represented by the image data GD in the display device 20 differ from those of the object T and the color reference 30.

As depicted in Step S32, the data generating device 10 generates adjusted image data AD based on the image data GD. Note that the display device 20 performing display according to the adjusted image data AD displays an image including the object image Ta and the color reference image 30a each adjusted in color difference.

Note that the data generating device 10 generates color difference adjusted image data based on the adjusted image data AD and a color conversion table. For example, the data generating device 10 generates color difference adjusted image data ADC1 for the first display device 210A based on the adjusted image data AD and the color conversion table CST1 for the first display device 210A. Furthermore, the data generating device 10 generates color difference adjusted image data ADC2 for the second display device 210B based on the adjusted image data AD and the color conversion table CST2 for the second display device 210B. Similarly, the data generating device 10 generates color difference adjusted image data ADC3 for the third display device 210C based on the adjusted image data AD and the color conversion table CST3 for the third display device 210C.

As depicted in Step S33, the data generating device 10 outputs an output signal including the color difference adjusted image data ADC1 to the first display device 210A. The first display device 210A displays an image G including the object image Ta and the color reference image 30a based on the color difference adjusted image data ADC1.

Similarly, the data generating device 10 outputs an output signal including the color difference adjusted image data ADC2 to the second display device 210B. The second display device 210B displays an image G including the object image Ta and the color reference image 30a based on the color difference adjusted image data ADC2. Note that the same applies to the third display device 210C and description thereof is therefore omitted.

Note that the first display device 210A, the second display device 210B, and the third display device 210C display not only the object image Ta but also the color reference image 30a in Step S33 in FIG. 8 for the sake of description, which should not be taken to limit the present embodiment. Typically, it is preferable that the color reference image 30a be deleted from the color difference adjusted image data and the first display device 210A, the second display device 210B, and the third display device 210C display the object image Ta. In this case, the color reference image 30a may be deleted from the adjusted image data AD in the data generating device 10. Alternatively, the color reference image 30a may be deleted from the color difference adjusted image data ADC1, ADC2, and ADC3 respectively in the first display device 210A, the second display device 210B, and the third display device 210C.

Furthermore, the data generating device 10 generates the adjusted image data AD from the image data GD and generates the color difference adjusted image data ADC1, ADC2, and ADC2 from the adjusted image data AD in the description with reference to FIG. 8, which should not be taken to limit the present embodiment. Generation of the color difference adjusted image data ADC1, ADC2, and ADC3 from the adjusted image data AD may be performed in a device different from the data generating device 10.

Moreover, the storage 18 of the data generating device 10 stores therein the color conversion tables CST1 to CST3 respectively for the first to third display device 210A to 210C and the data generating device 10 generates the color difference adjusted image data ADC1 to ADC3 respectively based on the adjusted image data AD and the color conversion tables CST1 to CST3 in the description with reference to FIG. 8, which should not be taken to limit the present embodiment. The color conversion table CST may be a general table that does not differ depending on a display device. In this case, it is possible that the data generating device 10 generates color difference adjusted image data based on the adjusted image data AD and the general color conversion table and transmits the color difference adjusted image data to various display devices.

Note that although a color chart is used as the color reference in the description with reference to FIGS. 2 to 8, which should not be taken to limit the present embodiment. The color reference may be a display device capable of performing display in various manners. For example, any of the display device 210, the first display device 210A, the second display device 210B, and the third display device 210C illustrated in FIGS. 6 to 8 that are capable of color difference correction using the corresponding color conversion tables may be used as the color reference. In this case, a color reference with further high accuracy can be generated by updating the corresponding color conversion tables in a timely manner. Furthermore, reproducibility of the color of the object T can be improved by changing the color conversion table according to the object T.

Note that the data generating device 10 may be used together with the monitor 22 in the adjusted image data generating system 100 as described with reference to FIG. 3. However, although the monitor 22 displays the color reference image 30a in FIG. 3, the present embodiment is not limited to this.

The user may set adjustment processing specifically in the data generating device 10 while causing the monitor 22 to display the image G based on either of both the image data GD and the adjusted image data AD. For example, the monitor 22 displays the object image Tg and the color reference image 30g based on the image data GD before image adjustment. Alternatively, the monitor 22 may display either or both the object image Ta and color reference image 30a based on the adjusted image data AD after image adjustment.

The user may switch the image being displayed by the monitor 22 through the input section 28. In one example, the monitor 22 displaying the object image Tg and the color reference image 30g based on the image data GD may display the object image Ta and the color reference image 30a based on the adjusted image data AD upon the user instructing image swathing through the input section 28. Furthermore, either or both an object and a range of an image to be adjusted may be changed and/specified in the data generating device 10.

Note that the entirety of the image G represented by the image data GD is adjusted in the description with reference to FIGS. 1 to 8, which should not be taken to limit the present embodiment. A part of the image G represented by the image data GD may be adjusted.

Figure 9:
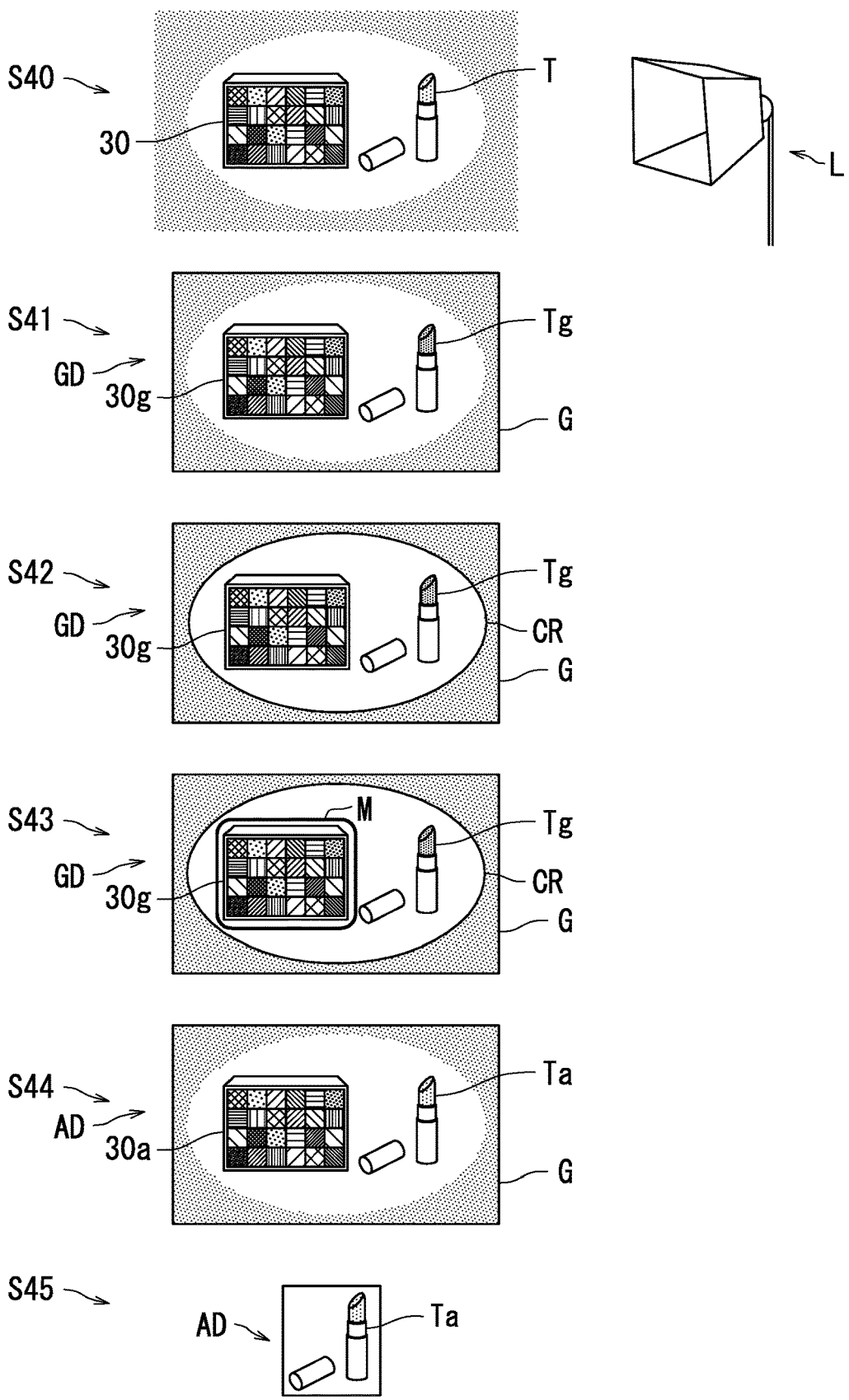
FIG. 9 is a schematic diagram explaining a flow of an adjusted image data generation method implemented by the adjusted image data generating device of the embodiment.

With reference to FIGS. 1 and 9, an adjusted image data generation method implemented by the data generating device 10 of the present embodiment is described next. FIG. 9 is a flow diagram explaining the adjusted image data generation method implemented by the data generating device 10 of the present embodiment. Note that Steps S40, S41, and S43 in FIG. 9 are respectively the same as Steps S10, S11, and S12 in FIG. 2 in all aspects other than that the image data GD is generated by capturing an image of an object T and a color reference 30 in an environment in which the object T, the color reference 30, and their surroundings are irradiated with light from a light source L, and therefore duplicate description is omitted for avoiding redundancy.

Image data GD is generated in Step S40 in FIG. 9 prior to the communication section 12 of the data generating device 10 receiving an input signal IS including the image data GD in Step S14. The image data GD is generated by capturing the image of an object T and the color reference 30 using an imaging device. Here, the image of the object T and the color reference 30 is captured in an environment in which the object T and the color reference 30 are irradiated with the light from the light source L. The light source L emits light that is oriented relatively highly. As such, the brightness of an area irradiated with the light from the light source L differs from the brightness of an area not irradiated with the light from the light source L. The object T and the color reference 30 are irradiated with the light from the light source L.

The image data GD represents an image G including an object image Tg that is an image of the object T and a color reference image 30g that is an image of the color reference 30. Here, the object T includes a lipstick and a lipstick container and the color reference 30 is a color chart indicating mutually different 24 color swatches. The color swatches of the color chart are arranged in a matrix of 4 rows by 6 columns.

Thereafter in Step S41, the data generating device 10 receives the image data GD. The image data GD represents the image G including the object image Tg that is an image of the object T and the color reference image 30g that is an image of the color reference 30.

Thereafter in Step S42, an adjustment target range CR is specified. For example, the adjustment target range CR is specified in correspondence with an area irradiated with the light from the light source L. As such, the object image Tg and the color reference image 30g are included in the adjustment target range CR in the image G.

The user is allowed to specify the adjustment target range CR in the image G through the input section 28. Alternatively, it is possible that information that specifies the adjustment target range CR is pre-stored in the storage 18 and is read out from the storage 18 as necessary.

In Step S43, the color reference image 30g in an extraction range M is cut out from the adjustment target range CR. The data generating device 10 may perform such processing with the object image Tg and the color reference image 30g displayed based on the image data GD. The adjusting section 14 assigns the extraction range M to the color reference image 30g of the image G and cuts out the color reference image 30g within the extraction range M.

Thereafter, color data of the cut-out color reference image 30g is acquired. The adjusting section 14 acquires the color data of the color reference image 30g. The color data may be acquired by measuring the color reference image 30g. Alternatively, the color data may be acquired based on a color signal indicating image data representing the color reference image 30g. Furthermore, the adjusting section 14 reads out color reference data RD of the color reference 30 from the storage 18.

The adjusting section 14 compares the color data acquired for the color reference 30 with color reference data. For example, the adjusting section 14 acquires a difference between the color reference data RD and the color data acquired for the color reference 30. Note that the adjusting section 14 may acquire a ratio between the color reference data RD and the color data acquired for the color reference 30. Alternatively, it is possible that the adjusting section 14 generates a color reference adjustment table based on the color reference data RD and the color data acquired for the color reference 30 and the storage 18 stores the color reference adjustment table.

In Step S44, the image data GD is converted to adjusted image data AD. The adjusting section 14 converts the image data GD to the adjusted image data AD in a manner described previously. Through conversion, the color reference image 30g within in the adjustment target range CR is converted to a color reference image 30a and the object image Tg is converted to an object image Ta.

Through conversion, the color in an area of the adjustment target range CR in the image G is converted. As such, the color reference image 30g is converted to the color reference image 30a and the object image Tg is converted to the object image Ta. By contrast, an area other than the adjustment target range CR remain unconverted even after conversion.

Thereafter in Step S45, the adjusting section 14 deletes a part of the adjusted image data AD corresponding to the color reference image 30a from the adjusted image data AD to make the adjusted image data AD correspond to the object image Ta. Thereafter, the communication section 12 transmits an output signal OS including the adjusted image data AD to an external device. For example, the communication section 12 transmits the output signal OS to a transmitter that is a transmission source of the input signal. In a manner described above, the adjusted image data AD is generated. In the present embodiment, the adjusted image data AD can be generated that enables display of the object image Ta exhibiting the color of the object T with high reproducibility.

Furthermore, the color of an image within an area irradiated with the relatively intensely bright light from the light source L is selectively adjusted in the present embodiment. This means that adjustment similar to that for the color reference image 30g is not performed on an image of an area located in an environment different from an environment in which the color reference 30 is located, eliminating unnecessary calculation.

Note that when the color in a specific area in the image G including the object image Tg is selectively adjusted, a boundary between an area in which the color is adjusted and an area in which the color is not adjusted in the image may be unnatural. In this case, color adjustment is preferably performed so as to blur the boundary.

With reference to FIGS. 1 to 10, an adjusted image data generation method implemented by the data generating device 10 of the present embodiment is described next. FIG.

10 is a flow diagram explaining the adjusted image data generation method implemented by the data generating device 10 of the present embodiment. Note that Steps S50 to S55 in FIG. 10 are respectively the same as Steps S40 to S45 in FIG. 9 in all aspects except the type of the light source and image adjustment in Step S54 and duplicate description is therefore omitted for avoiding redundancy.

Figure 10:
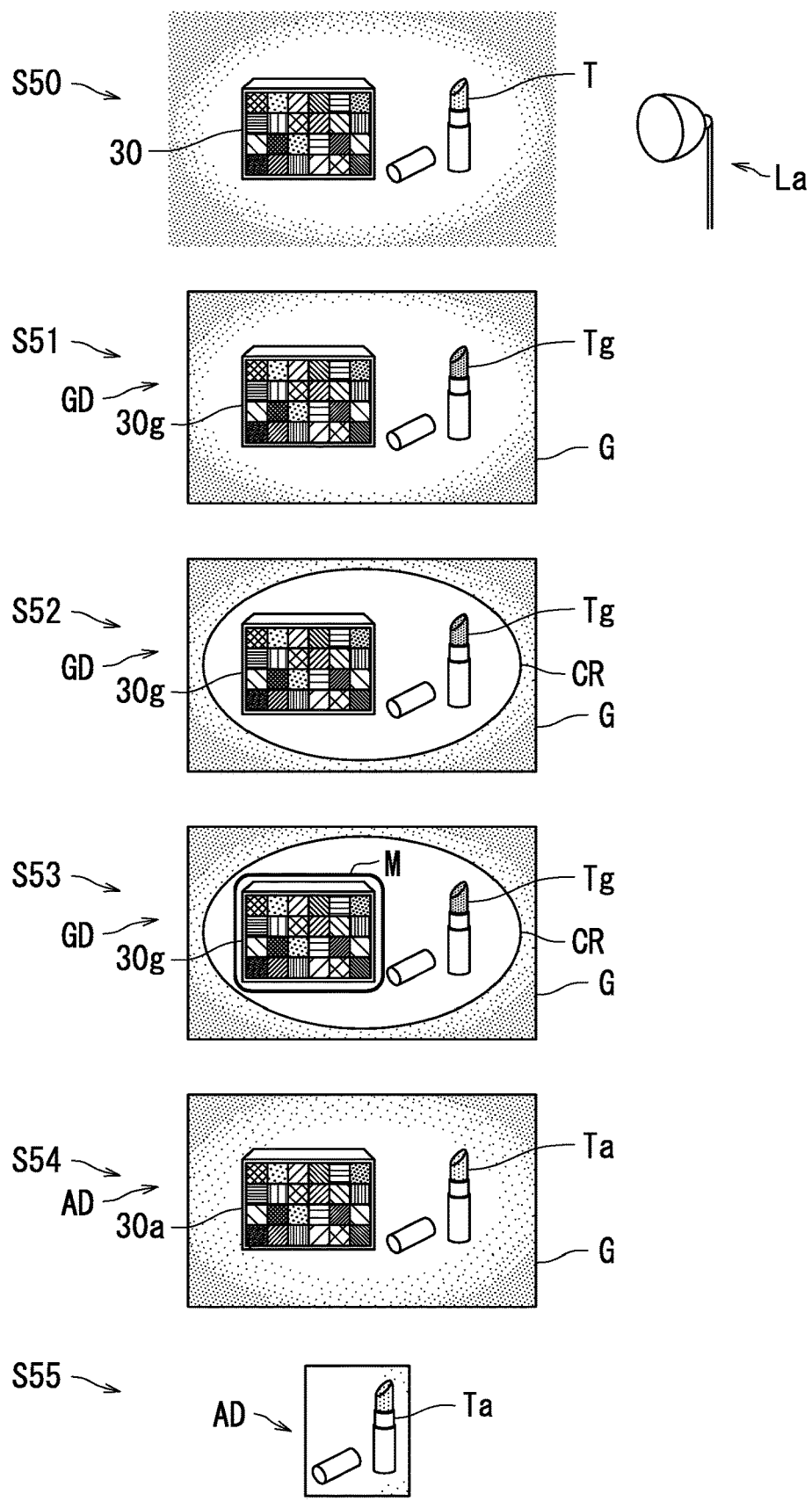
FIG. 10 is a schematic diagram explaining a flow of an adjusted image data generation method implemented by the adjusted image data generating device of the embodiment.

Image data GD is generated in Step S50 in FIG. 10 prior to the communication section 12 of the data generating device 10 receiving an input signal IS including the image data GD in Step S51. The image data GD is generated by capturing an image of an object T and a color reference 30 using an imaging device. Here, the image of the object T and the color reference 30 is captured in an environment in which the object T and the color reference 30 are irradiated with light from a light source La. The light source La emits light that is oriented relatively low. As such, the brightness of an area irradiated with the light from the light source La slightly differs from the brightness of an area not irradiated with the light from the light source La. The object T and the color reference 30 are irradiated with the light from the light source La.

Thereafter in Step S51, the data generating device 10 receives the image data GD. The image data GD represents an image G including an object image Tg that is an image of the object T and a color reference image 30g that is an image of the color reference 30.

Thereafter in Step S52, an adjustment target range CR is specified. For example, the adjustment target range CR is specified in correspondence with the area irradiated with the light from the light source La. As such, the object image Tg and the color reference image 30g are included in the adjustment target range CR in the image G.

The user is allowed to specify the adjustment target range CR in the image G through the input section 28. Alternatively, it is possible that the adjustment target range CR is pre-stored in the storage 18 and is read out from the storage 18 as necessary.

In Step S53, the color reference image 30g in an extraction range M is cut out from the adjustment target range CR. The data generating device 10 may perform such processing with the object image Tg and the color reference image 30g displayed based on the image data GD. The adjusting section 14 assigns the extraction range M to the color reference image 30g of the image G and cuts out the color reference image 30g within the extraction range M.

Thereafter, color data of the cut-out color reference image 30g is acquired. The adjusting section 14 acquires the color date of the color reference image 30g. The color data may be acquired by measuring the color reference image 30g. Alternatively, the color data may be acquired based on a color signal indicating image data representing the color reference image 30g. Furthermore, the adjusting section 14 reads out color reference data RD for the color reference 30 from the storage 18.

The adjusting section 14 compares the color data acquired for the color reference 30 with the color reference data. For example, the adjusting section 14 acquires a difference between the color reference data RD and the color data acquired for the color reference 30. Note that the adjusting section 14 may acquire a ratio between the color reference data RD and the color data acquired for the color reference 30. Alternatively, it is possible that the adjusting section 14 generates a color reference adjustment table based on the color reference data RD and the color data acquired for the color reference 30 and the storage 18 stores the color reference adjustment table.

In step S54, the image data GD is converted to adjusted image data AD. The adjusting section 14 converts the image data GD to the adjusted image data AD in a manner as described previously. Through conversion, the color reference image 30g within the adjustment target range CR is converted to a color reference image 30a and the object image Tg is converted to an object image Ta.

Here, the adjusting section 14 adjusts the adjusted image data AD so that the boundary between the inside and outside of the adjustment target range CR in the image G is not perceivable. For example, the adjusting section 14 specifies a background image behind the color reference image 30g and the object image Tg in the adjustment target range CR and adjusts the adjusted image data AD so that the color of the background image changes step by step from the inside toward the outside of the adjustment target range CR.

Thereafter in Step S55, the adjusting section 14 deletes a part of the adjusted image data AD corresponding to the color reference image 30a from the adjusted image data AD to make the adjusted image data AD correspond the object image Ta. Thereafter, the communication section 12 transmits an output signal OS including the adjusted image data AD to an external device. For example, the communication section 12 transmits the output signal OS to a transmitter that is a transmission source of the input signal. In a manner described above, the adjusted image data AD is generated. In the present embodiment, the adjusted image data AD can be generated that enables display of the object image Ta exhibiting the color of the object T with high reproducibility. Furthermore, in the present embodiment, the background image in the image G other than the object image Ta can be displayed naturally even when the image G including the object image Ta includes both the area irradiated with the light from the light source La and the area not irradiated with the light from the light source La.

Note that the outside of the adjustment target range CR in the image G remains in the image data GD even after specification of the adjustment target range CR in the image G in the description with reference to FIGS. 9 and 10, which should not be taken to limit the present embodiment. The image data GD may be processed so that an image of the outside of the adjustment target range CR in the image G is deleted as a result of specification of the adjustment target range CR in the image G.

Furthermore, the adjusted image data AD is generated from the image data GD representing the color reference image 30g and the object image Tg in the description with reference to FIGS. 1 to 10, which should not be taken to limit the present embodiment. The image data may represent an object image without representing a color reference image. In this case, adjusted image data in which image data representing the object image has been adjusted may be generated based on a color reference adjustment table generated based on the color reference data and color data of image data representing the color reference image.

The color reference adjustment table is generated based on the color reference data and the image data representing the color reference image. In this case, once the color reference adjustment table is generated in a specific environment, the object image can be adjusted by using the same color reference adjustment table even without capturing an image of the color reference if the environment is similar.

Figure 11:
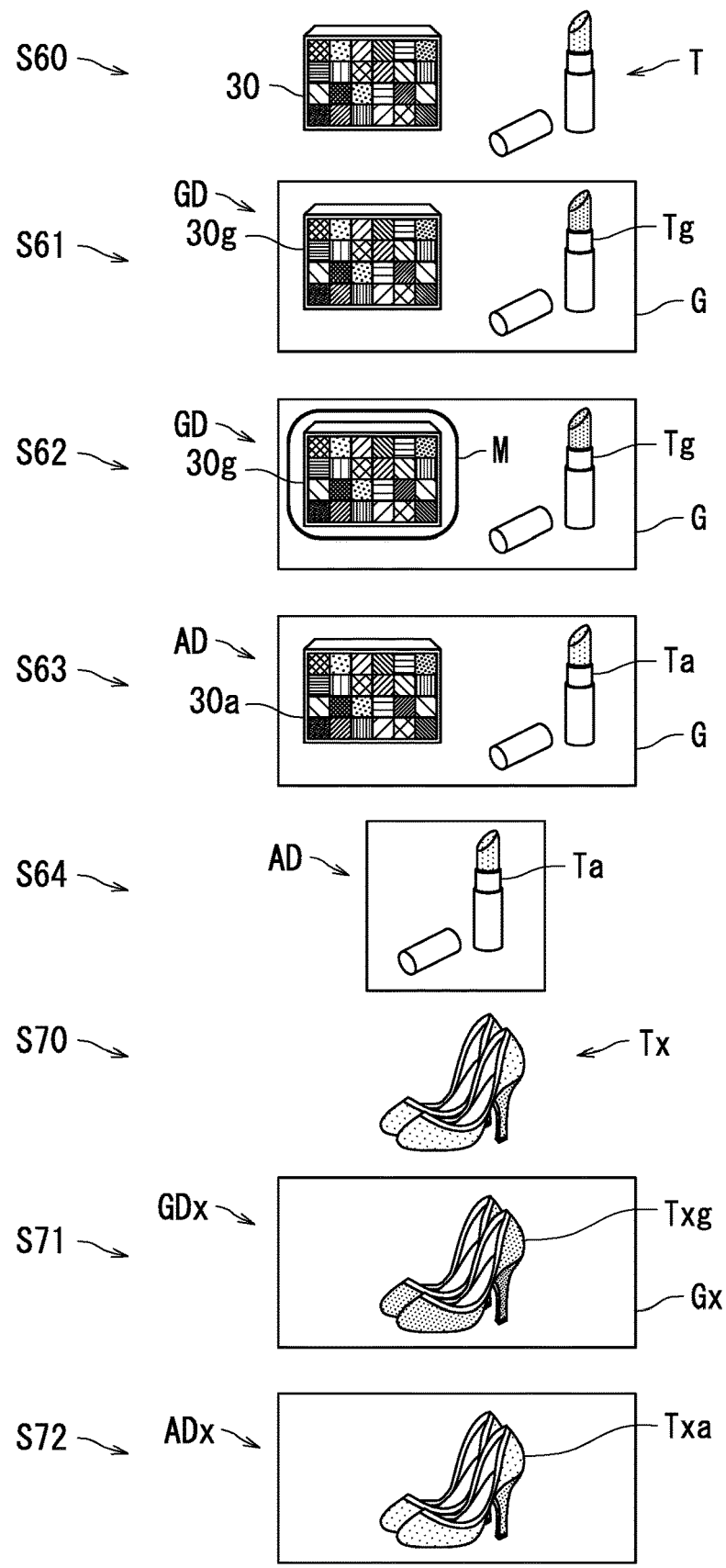
FIG. 11 is a schematic diagram explaining a flow of an adjusted image data generation method implemented by the adjusted image data generating device of the embodiment.

With reference to FIGS. 1 to 11, an adjusted image data generation method implemented by the data generating device 10 of the present embodiment is described next. FIG. 11 is a flow diagram explaining the adjusted image data generation method implemented by the data generating device 10 of the present embodiment. Steps S60 to S64 in FIG. 11 are respectively the same as Steps S10 to S12, S16, and S17 described with reference to FIG. 2. Therefore, duplicate description is omitted for avoiding redundancy. Note that conversion from a color reference image 30g to a color reference image 30a is performed according to a color reference adjustment table. In the present embodiment, the data generating device 10 generates the color reference adjustment table and the storage 18 stores the color reference adjustment table. The color reference adjustment table may be used in adjustment of another object image.

Image data GD is generated in Step S60 in FIG. 11 prior to the communication section 12 of the data generating device 10 receiving an input signal IS including the image data GD in Step S61. The image data GD is generated by capturing an image of an object T and a color reference 30 using an imaging device.

In Step S61 in FIG. 11, the data generating device 10 receives the image data GD. The image data GD represents an image G including an object image Tg that is an image of the object T and a color reference image 30g that is an image of the color reference 30.

Thereafter in Step S62, the color reference image 30g in an extraction range M is cut out from the image G The data generating device 10 may perform such processing with the object image Tg and the color reference image 30g displayed based on the image data GD. The adjusting section 14 assigns the extraction range M to the color reference image 30g of the image G and cuts out the color reference image 30g within the extraction range M.

Thereafter, color data of the cut-out color reference image 30g is acquired. The adjusting section 14 acquires the color data of the color reference image 30g. The color data may be acquired by measuring the color reference image 30g. Alternatively, the color data may be acquired based on a color signal indicating image data representing the color reference image 30g. Furthermore, the adjusting section 14 reads out color reference data RD of the color reference 30 from the storage 18.

The adjusting section 14 compares the color data acquired for the color reference 30 with color reference data. For example, the adjusting section 14 acquires a difference between the color reference data RD and the color data acquired for the color reference 30. Note that the adjusting section 14 may acquire a ratio between the color reference data RD and the color data acquired for the color reference 30. Alternatively, it is possible that the adjusting section 14 generates a color reference adjustment table based on the color reference data RD and the color data acquired for the color reference 30 and the storage 18 stores the color reference adjustment table.

In Step S63, the image data GD is converted to adjusted image data AD. The adjusting section 14 converts the image data GD to the adjusted image data AD in a manner described previously. Through conversion, the color reference image 30g is converted to a color reference image 30a and the object image Tg is converted to an object image Ta.

Thereafter in Step S64, the adjusting section 14 deletes a part of the adjusted image data AD corresponding to the color reference image 30a from the adjusted image data AD to make the adjusted image data AD correspond to the object image Ta.

Furthermore, image data GDx is generated in Step S70. The image data GDx is generated by capturing an image of an object Tx using an imaging device. Note that the image of the object Tx is captured preferably in an environment similar to an environment in which the color reference 30 and the object T are located. The image data GDx represents an image Gx including an object image Txg that is an image of the object Tx. Here, the object Tx is a pair of shoes. Note that the object Tx may be also referred to below as additional object.

Thereafter in Step S71, the data generating device 10 receives the image data GDx. The image data GDx represents the image Gx including the object image Txg that is an image of the object Tx.

In Step S72, the adjusting section 14 converts the image data GDx to adjusted image data ADx according to the color reference adjustment table. When the adjusting section 14 converts the image data GDx to the adjusted image data ADx, the object image Txg changes to an object image Txa. Through conversion as above, a color difference between the color of the object Tx and the color of the object image Txa can be corrected.

In a manner as described above, the adjusted image data AD and the adjusted image data ADx are generated. In the present embodiment, the object image Txg is adjusted to the object image Txa using the color reference adjustment table pre-acquired using the color reference image 30g. As such, the image data GDx representing the object image Txg can be adjusted to the adjusted image data ADx without capturing an image of the object Tx that is the additional object together with the color reference 30. Thus, the color of the object image can be exhibited with higher reproducibility with less effort.

Note that the image data for which the color reference adjustment table is referred to is preferably generated by capturing an image in a similar environment. This enables generation of adjusted image data using an appropriate color reference adjustment table.

When the color reference adjustment table is used, the adjusted image data in which the object image has been adjusted from the image data representing the object image can be generated even when the image data does not represent the color reference image as described with reference to FIG. 11. In this case, it is preferable that an image data item from which adjusted image data should be generated be selectable from image data items.

Figure 12A:
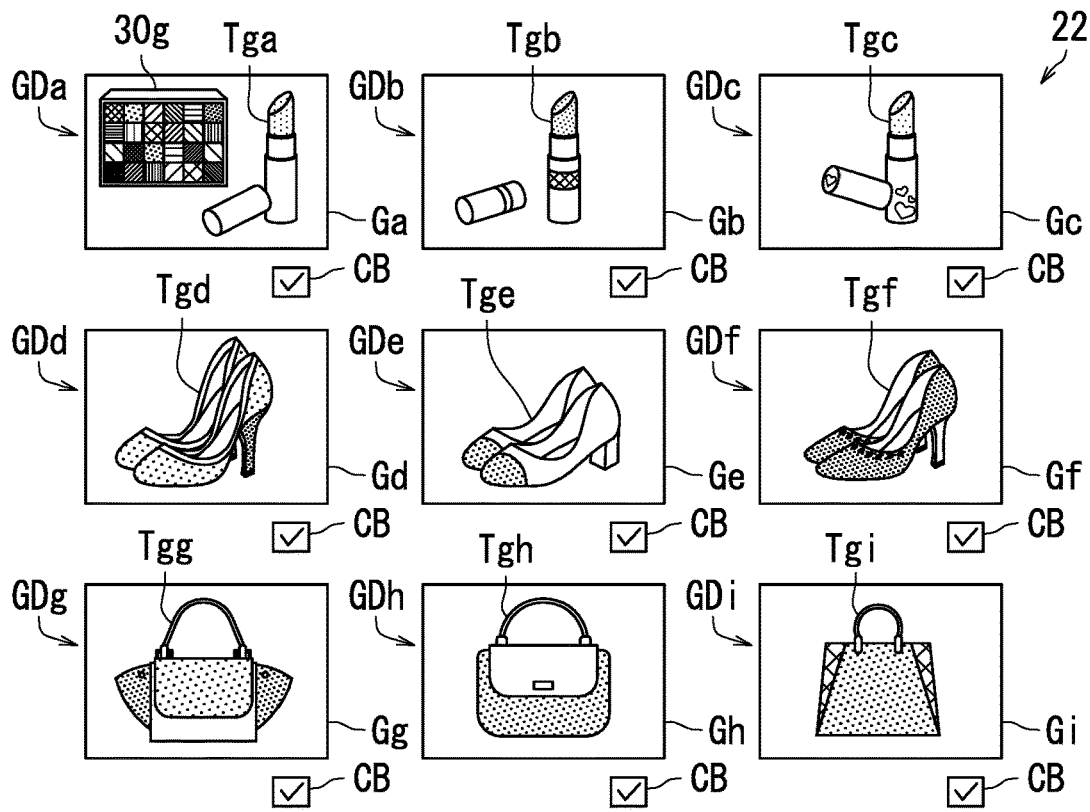
FIG. 12A is a schematic diagram illustrating image data before image adjustment by the adjusted image data generating device of the embodiment.
Figure 12B:
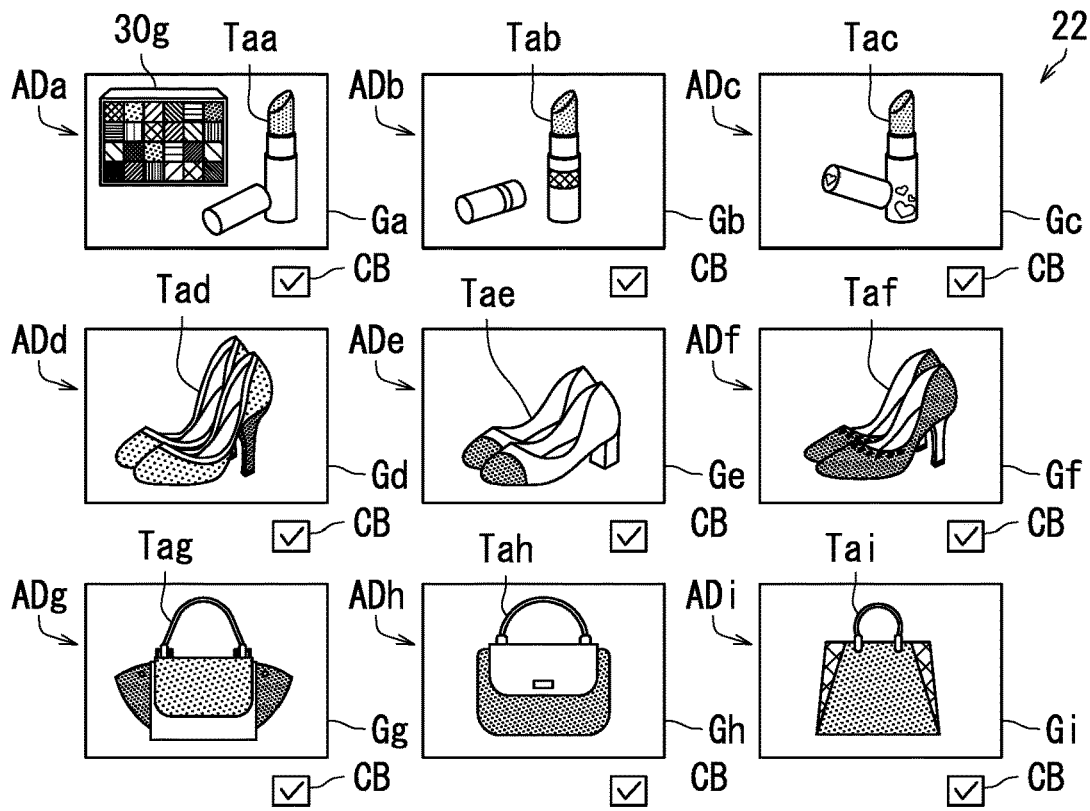
FIG. 12B is a schematic diagram illustrating adjusted image data after image adjustment by the adjusted image data generating device of the embodiment.

An aspect of selective generation of an adjusted image data item corresponding to an image data item among image data items is described next with reference to FIGS. 1 to 12B. FIG. 12A is a schematic diagram of the monitor 22 displaying a plurality of images before adjustment, and FIG. 12B is a schematic diagram of the monitor 22 displaying a plurality of adjusted images.

As illustrated in FIG. 12A, the monitor 22 displays a plurality of images Ga to Gi based on image data items GDa to GD, respectively. The image Ga includes an object image Tga and a color reference image 30g. The image Gb includes an object image Tgb. Similarly, the images Gc to Gi include object images Tgc to Tgi, respectively. Here, the image Ga includes the color reference image 30g while the images Gb to Gi do not include the color reference image 30g.

Furthermore, the monitor 22 displays check boxes for the corresponding images Ga to Gi. The check boxes CB indicate whether or not the user desires adjustment of the corresponding images Ga to Gi. The user desiring color adjustment on any of the images Ga to Gi checks a check box CB of a corresponding image among the images Ga to Gi through the input section 28.

Here, all the check boxes CB corresponding to the respective images G1 to G9 are checked. As such, the adjusting section 14 generates, based on image data items GDa to GDi respectively corresponding to the images Ga to Gi, adjusted data items ADa to ADi in which the object images Tga to Tgi have been adjusted to object images Taa to Tai, respectively.

As illustrated in FIG. 12B, the monitor 22 displays the images Ga to Gi respectively based on the adjusted image data items Ada to ADi. The image Ga includes an object image Taa and a color reference image 30a. The image Gb includes an object image Tab. Similarly, the images Gc to Gi include object images Tac to Tai, respectively. Here, the image Ga includes the color reference image 30a while the images Gb to Gi do not include the color reference image 30a. In a manner as above, the object images Tgb to Tgi can be adjusted to the object images Tab to Tai, respectively, even when the images Gb to Gi do not include the color reference image 30g.

In the present embodiment, as a result of all the check boxes CB corresponding to the respective images Ga to Gi before adjustment being checked, the object images Tga to Tgi of the images Ga to Gi are adjusted to the object images Taa to Tai, respectively. However, selective checking of a check box CB may result in adjustment of selected one(s) the object images Tga to Tgi to corresponding one(s) of the object images Taa to Tai.

Note that Steps S60 to S64 and Steps S70 to S72 are described as a series of operation in the description with reference to FIG. 11, which should not be taken to limit the present embodiment. Steps S60 to S64 and Steps S70 to S70S72 may be performed separately. For example, Steps S70 to S72 may be performed on a day different from a day on which Steps S60 to S64 are performed. However, it is preferable to perform image capture in Step S60 and image capture in Step S70 in the substantially same environment. Similarly, image capture for generating the image data items GDa to GDi described with reference to FIG. 12A is preferably performed in the substantially same environment.

Note that an image of the color reference 30 together with the object T is captured and the adjusted image data AD is generated by adjusting the image data GD representing the color reference image 30g and the object image Tg in the description with reference to FIGS. 1 to 12, which should not be taken to limit the present embodiment. It is possible that an image of only the color reference 30 is captured and adjusted and adjusted image data AD in which the image data representing the object image has been adjusted is generated.

Figure 13:
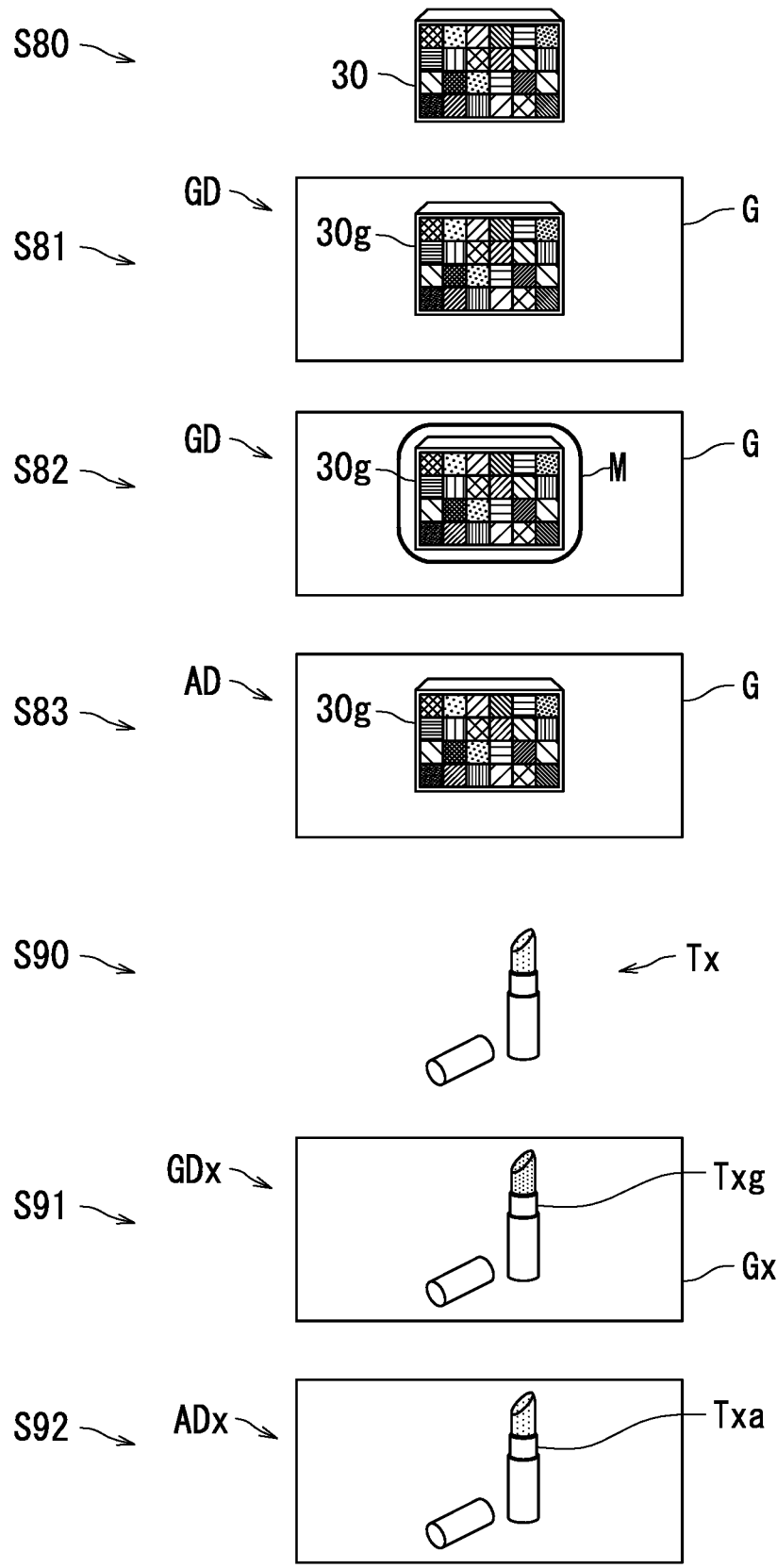
FIG. 13 is a schematic diagram explaining a flow of an adjusted image data generation method implemented by the adjusted image data generating device of the embodiment.

Next, an adjusted image data generation method implemented by the data generating device 10 of the present embodiment is described with reference to FIGS. 1 to 13. FIG. 13 is a flow diagram explaining the adjusted image data generation method implemented by the data generating device 10 of the present embodiment.

Steps S80 to S83 in FIG. 13 are respectively the same as Steps S60 to S63 described with reference to FIG. 11 in all aspects other than that an image of only the color reference 30 is captured. As such, duplicate description is omitted for avoiding redundancy. Note that conversion from a color reference image 30g to a color reference image 30a is performed according to a color reference adjustment table. In the present embodiment, the data generating device 10 generates the color reference adjustment table and stores the color reference adjustment table in the storage 18. The color reference adjustment table is used for color adjustment of an image of an object prepared separately from a color reference 30.

Image data GD is generated in Step S80 in FIG. 13 prior to the communication section 12 of the data generating device 10 receiving an input signal IS including the image data GD in Step S81. The image data GD is generated by capturing an image of the color reference 30 using an imaging device.

Thereafter in Step S81, the data generating device 10 receives the image data GD. The image data GD represents an image G including a color reference image 30g that is an image of the color reference 30.

Thereafter in Step S82, the color reference image 30g in an extraction range M is cut out from the image G The data generating device 10 may perform such processing with the color reference image 30g displayed based on the image data GD. The adjusting section 14 assigns the extraction range M to the color reference image 30g of the image G and cuts out the color reference image 30g within the extraction range M.

Thereafter, color data of the cut-out color reference image 30g is acquired. The adjusting section 14 acquires the color date of the color reference image 30g. The color data may be acquired by measuring the color reference image 30g. Alternatively, the color data may be acquired based on a color signal indicating image data representing the color reference image 30g. Furthermore, the adjusting section 14 reads out color reference data RD for the color reference 30 from the storage 18.

The adjusting section 14 compares the color data acquired for the color reference 30 with the color reference data. For example, the adjusting section 14 acquires a difference between the color reference data RD and the color data acquired for the color reference 30. Note that the adjusting section 14 may acquire a ratio between the color reference data RD and the color data acquired for the color reference 30. Alternatively, it is possible that the adjusting section 14 generates a color reference adjustment table based on the color reference data RD and the color data acquired for the color reference 30 and the storage 18 stores the color reference adjustment table.

In step S83, the image data GD is converted to adjusted image data AD. The adjusting section 14 converts the image data GD to the adjusted image data AD in a manner described previously. Through conversion, the color reference image 30g in the image G is converted to a color reference image 30a.

In Step S90, image data GDx is generated. The image data GDx is generated by capturing an image of an object Tx using an imaging device. Note that the image of the object Tx is captured preferably in an environment similar to the environment in which the color reference 30 is located. The image data GDx represents an image Gx including an object image Txg that is an image of the object Tx. Here, the object Tx is a lipstick.

Thereafter in Step S91, the data generating device 10 receives the image data GDx. The image data GDx represents the image Gx including the object image Txg that is an image of the object Tx.

In Step S92, the adjusting section 14 converts the image data GDx to adjusted image data ADx according to the color reference adjustment table. When the adjusting section 14 converts the image data GDx to the adjusted image data ADx, the object image Txg changes to an object image Txa. Through conversion as above, a color difference between the color of the object Tx and the color of the object image Txa can be corrected.

In a manner as described above, the adjusted image data AD and the adjusted image data ADx are generated. In the present embodiment, the object image Txg is adjusted to the object image Txa using the color reference adjustment table pre-acquired using the color reference image 30g. As such, the image data GDx representing the object image Txg can be adjusted to the adjusted image data ADx without capturing a single image of the object Tx and the color reference 30. Thus, the color of the object image can be exhibited with higher reproducibility with less effort.

As described previously, the adjusted image data generating device 10 preferably stores a color reference adjustment table. For example, the adjusted image data generating device 10 preferably stores color reference adjustment tables for different image capture environments.

Figure 14:
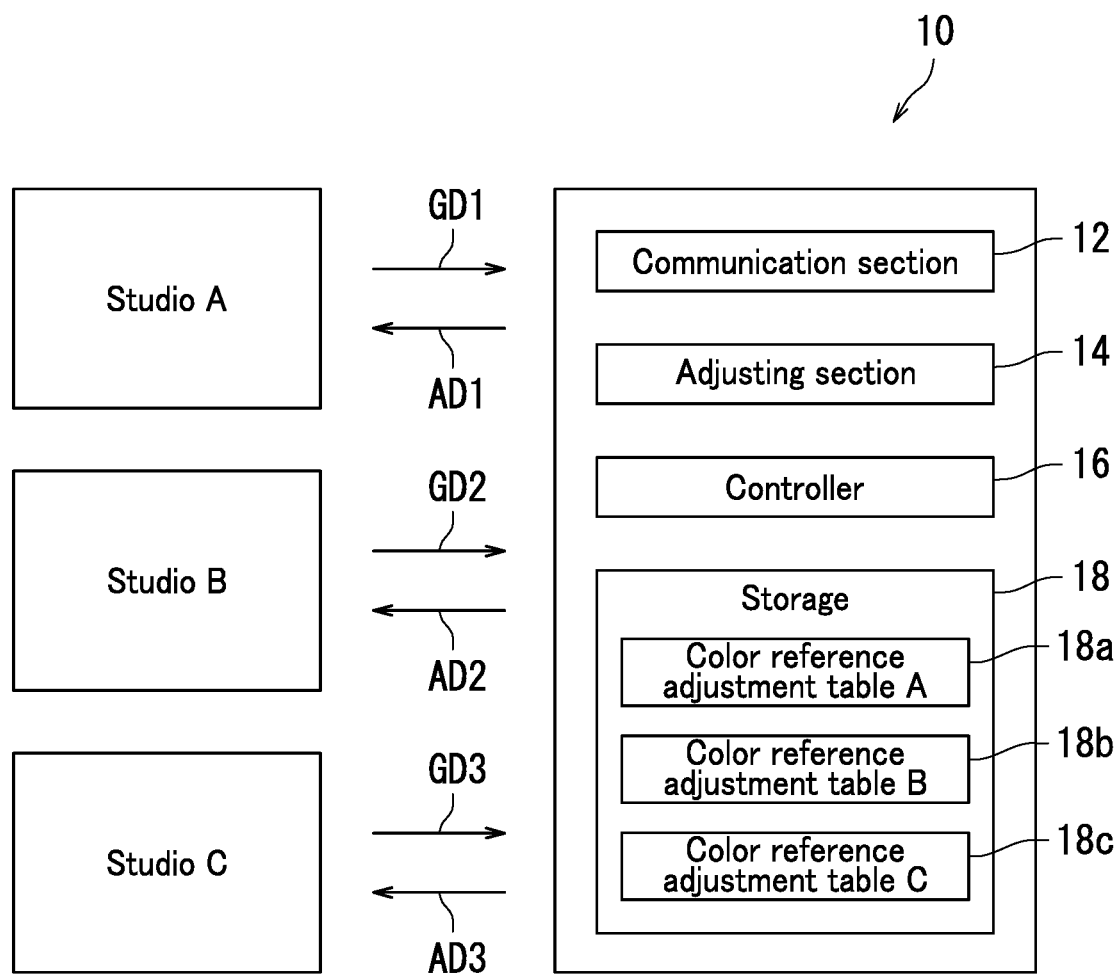
FIG. 14 is a schematic diagram explaining generation of adjusted image data by the adjusted image data generating device of the embodiment.

With reference to FIGS. 1 to 14, an adjusted image data generation method implemented by the data generating device 10 of the present embodiment is described next. FIG. 14 is a schematic diagram of the data generating device 10 of the present embodiment. Here, the data generating device 10 receives image data items from different users and transmits adjusted image data items to the corresponding users.

Here, the data generating device 10 generates adjusted image data items by adjusting image data items transmitted from a studio A, a studio B, and a studio C, and outputs the adjusted image data items. Note that although image capture environments in the studio A, the studio B, and the studio C differ from each other but determined in the same manner.

Furthermore, the storage 18 stores color reference adjustment tables A, B, and C therein. For example, the color reference table A is a table used for image adjustment suitable for image data obtained by image capture in an image capture environment in the studio A. Typically, the color reference adjustment table A is generated based on a color reference image obtained by capturing an image of the color reference in the studio A. Similarly, the color reference B is a table used for image adjustment suitable for image data obtained by image capture in an image capture environment in the studio B, and the color reference table C is a table used for image adjustment suitable for image data obtained by image capture in an image capture environment in the studio C.

Upon receiving an input signal including an image data item GD1 from the studio A, the data generating device 10 generates an adjusted image data item AD1 in which the image data item GD1 has been adjusted based on the color reference adjustment table A, and transmits an output signal including the adjusted image data item AD1 to the studio A. Upon receiving an input signal including an image data item GD2 from the studio B, the data generating device 10 generates an adjusted image data item AD2 in which the image data item GD2 has been adjusted based on the color reference adjustment table B, and transmits an output signal including the adjusted image data item AD2 to the studio B. Similarly, upon receiving an input signal including an image data item GD3 from the studio C, the data generating device 30 generates an adjusted image data item AD3 in which the image data item GD3 has been adjusted based on the color reference adjustment table C, and transmits an output signal including the adjusted image data item AD3 to the studio C.

By using different color reference adjustment tables for different image capture environments in which corresponding image data items GD have been generated, adjusted image data items according to the corresponding image capture environments can be generated as described above.

Note that the adjusted image data generating device 10 of the present embodiment preferably works in conjunction with an application programming interface (API). For example, the adjusted image data generating device 10 may work in conjunction with another program. Typically, an adjusted image data generation program that embodies the adjusted image data generating device 10 may be run in conjunction with another program. In the present specification, the program that works in conjunction with the adjusted image data generation program may be referred to as cooperating target program.

In one example, it is possible that the adjusted image data generation program in the present embodiment is called by the cooperating target program and an object image Ta based on adjusted image data AD generated by running the adjusted image data generation program is displayed as an image of a part of a display screen displayed by running the cooperating target program. It is possible that the cooperating target program requests the adjusted image data generation program of the present embodiment to transmit adjusted image data representing an object image and the adjusted image data generation program of the present embodiment transmits the adjusted image data in response to the request.

Figure 15:
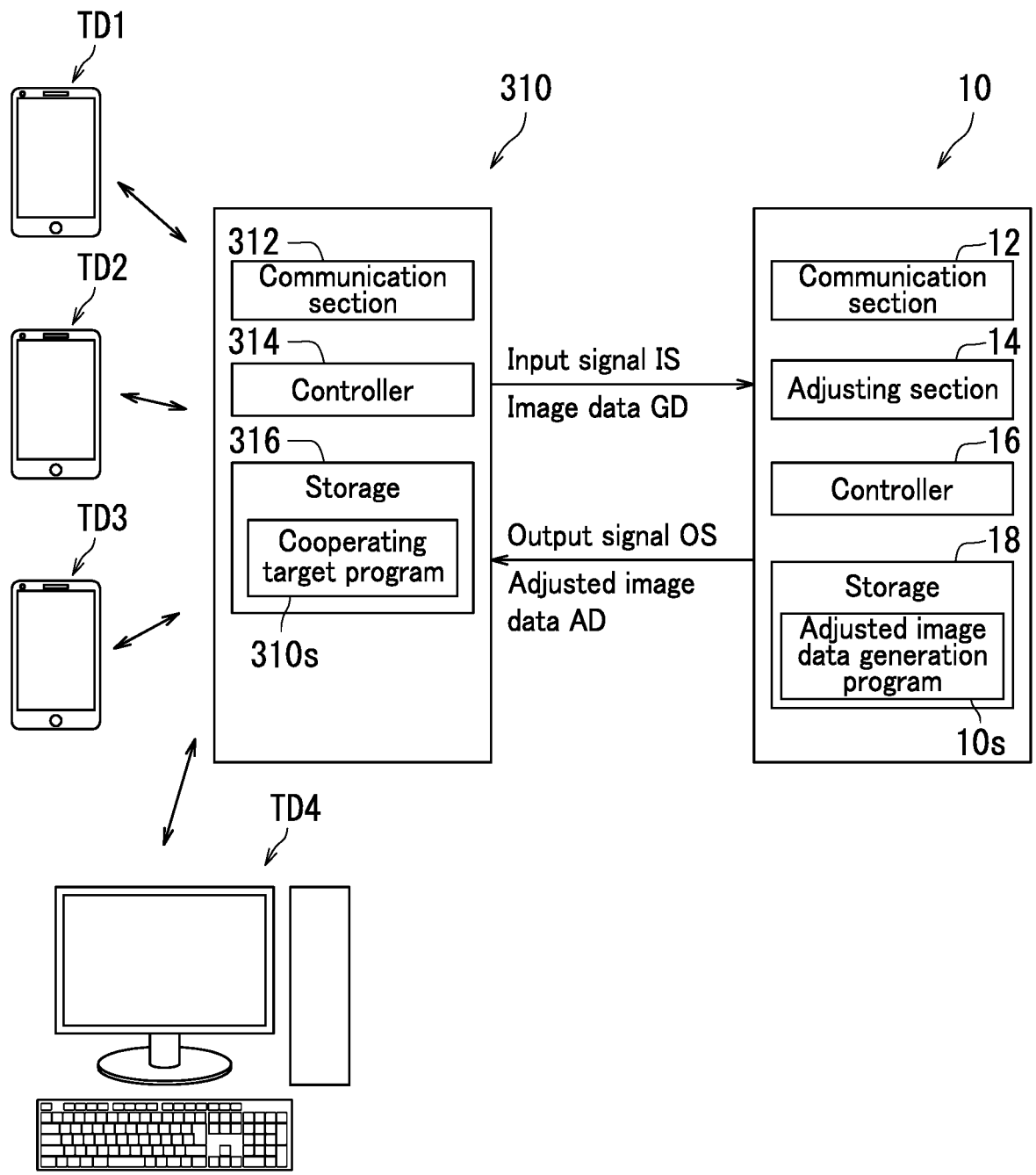
FIG. 15 is a schematic diagram explaining a cooperating device that works in conjunction with the adjusted image data generating device of the embodiment.

Next, a cooperating device 310 that works in conjunction with the adjusted image data generating device 10 of the present embodiment is described with reference to 15. FIG. 15 is a schematic diagram explaining the cooperating device 310 and the adjusted image data generating device 10 of the present embodiment. Here, the storage 18 stores an adjusted image data generation program 10s therein. The controller 16 executes the adjusted image data generation program 10s to embody the adjusting section 14.

The cooperating device 310 communicates with terminal devices TD1 to TD4. The cooperating device 310 transmits image data representing a display image to be displayed by the terminal devices TD1 to TD4 based on instructions from the respective terminal devices TD1 to TD4. Here, the terminal devices TD1 to TD3 each are a smartphone and the terminal device T4 is a personal computer.

The adjusted image data generating device 10 communicates with the cooperating device 310. The adjusted image data generating device 10 works in conjunction with the cooperating device 310 in response to an instruction from the cooperating device 310.

Based on user instructions, the terminal devices TD1 to TD4 request the cooperating device 310 to transmit image data representing an image to be displayed on display screens of the terminal devices TD1 to TD4. The cooperating device 310 requests the adjusted image data generating device 10 to output adjusted image data AD as at least a part of image data.

In response to the request from the cooperating device 310, the adjusted image data generating device 10 outputs an output signal OS including the adjusted image data AD to the cooperating device 310. In response to the requests from the terminal devices TD1 to TD4, the cooperating device 310 transmits the image data used as at least a part of the adjusted image data AD to the terminal devices TD1 to TD4.

The cooperating device 310 includes a communication section 312, a controller 314, and storage 316. The controller 314 controls the communication section 312 and the storage 316. The communication section 312 communicates with an external terminal. For example, the communication section 312 communicates with the terminal devices TD1 to TD4 and the adjusted image data generating device 10.

The storage 316 stores a cooperating target program 310s therein. The cooperating target program 310s may be a program for causing display of a display screen for product selling. Alternatively, the cooperating target program may be an inventory management program working in conjunction with the display screen for product selling.

It is also possible that the cooperating device 310 receives an output signal including the adjusted image data AD prior to requests from the terminal devices TD1 to TD4 and the storage 316 stores the adjusted image data AD. Alternatively, the cooperating device 310 may request the adjusted image data generating device 10 to output the adjusted image data AD in response to requests from the terminal devices TD1 to TD4.

In a manner as described above, the cooperating device 310 transmits a signal including the image data GD to the adjusted image data generating device 10 in response to requests from the terminal devices TD1 to TD4 or prior to requests from the terminal devices TD1 to TD4, and requests the adjusted image data generating device 10 to output a signal including the adjusted image data AD. Similarly, the adjusted image data generating device 10 receives an input signal IS including the image data GD from the cooperating device 310 in response to requests from the terminal devices TD1 to TD4 or prior to requests from the terminal devices TD1 to TD4, and transmits an output signal OS including the adjusted image data AD to the cooperating device 310. As such, the terminal devices TD1 to TD4 are enabled to display an image including the object image Ta through receiving a signal including the adjusted image data from the cooperating device 310.

In the present embodiment, the adjusted image data generating device 10 works in conjunction with the cooperating device 10. As such, users of the terminal devices TD1 to TD4 can receive adjusted image data by execution of the cooperating target program 310s of the cooperating device 310 without direct execution of the adjusted image data generation program 10s of the data generating device 10, and visually check the object image displayed with color exhibiting high reproducibility.

An embodiment of the present invention has been described so far with reference to the drawings. However, the present invention is not limited to the above-described embodiment and can be practiced in various ways within the scope without departing from the essence of the present invention. Furthermore, any of the elements of configuration disclosed in the above embodiment may be altered as appropriate. For example, some of all the elements of configuration indicated in an embodiment may be added to an element of configuration in another embodiment or some of all the elements of configuration indicated in an embodiment may be omitted from the embodiment.

Moreover, the drawings schematically illustrate elements of configuration in order to facilitate understanding of the present invention and properties of elements of configuration illustrated in the drawings, such as thickness, length, number, and interval thereof, may differ from actual properties thereof in order to facilitate preparation of the drawings. In addition, the elements of configuration indicated in the above embodiment are only examples that do not impose any particular limitations and can be altered in various ways to the extent that there is not substantial deviation from the advantages of the present invention.

INDUSTRIAL APPLICABILITY

According to the present invention, adjusted image data that can exhibit color of an object with high reproducibility can be generated.

REFERENCE SINGS LIST 10 adjusted image data generating device
12 communication section
14 adjusting section
16 controller
18 storage
100 adjusted image data generation system
200 color difference adjusted image display system

The invention claimed is:

1. An adjusted image data generating device comprising:
storage that stores reference data representing colors of a color chart therein; and
an adjusting section configured to generate first adjusted image data by adjusting an RGB signal indicating an object image for image data representing an image containing both a color chart image and the object image so that color data representing colors of the color chart image matches the reference data, the color chart image being an image of the color chart, the object image being an image of an object, wherein
generating the first adjusted image data includes adjusting the RGB signal in only a portion of the image containing both the color chart image and the object image that is in an adjustment target range, the adjustment target range including the object image and being smaller than an entirety of the image,
the storage stores therein a color conversion table used to correct a color difference between the adjusted image data generating device and a display device, and
the adjusted image data generating device generates second adjusted image data by converting a color signal of the first adjusted image data based on the color conversion table.

2. The adjusted image data generating device according to claim 1, wherein
the adjusting section deletes a part of the color chart image from the first adjusted image data.

3. The adjusted image data generating device according to claim 1, wherein
the adjusting section acquires a difference between the color reference data and the color data.

4. The adjusted image data generating device according to claim 1, wherein
the adjusting section generates a color reference adjustment table based on the color reference data and the color data, and
the adjusting section generates third adjusted image data by adjusting an additional object image for image data representing the additional object image based on the color reference adjustment table, the additional object image being an image of an additional object.

5. A color difference adjusted image display system comprising:
the adjusted image data generating device according to claim 1; and
the display device, wherein
the display device displays the object image based on the second adjusted image data.

6. The adjusted image data generating device according to claim 1, wherein
the color conversion table defines a matching relationship between color of an image displayed by the display device according to reference color signal data and color of an image displayed by the adjustment image data generating device according to the reference color signal data.

7. A color difference adjusted image data generation method comprising:
storing reference data representing colors of a color chart;
generating first adjusted image data in an adjusted image data generating device by adjusting an RGB signal indicating an object image for image data representing an image containing both a color chart image and the object image so that color data representing colors of the color chart image matches the reference data, the color chart image being an image of the color chart, the object image being an image of an object;

generating the first adjusted image data includes adjusting the RGB signal in only a portion of the image containing both the color chart image and the object image that is in an adjustment target range, the adjustment target range including the object image and being smaller than an entirety of the image;

generating a color conversion table used to correct a color difference between the adjusted image data generating device and a display device; and generating second adjusted image data by converting a color signal of the first adjusted image based on the color conversion table.

8. The color difference adjusted image data generation method according to claim 7, further comprising deleting a part of the color chart image from the first adjusted image data.

9. The color difference adjusted image data generation method according to claim 7, wherein in the generating first adjusted image data, a difference between the reference data and the color data is acquired.

10. The color difference adjusted image data generation method according to claim 7, wherein in the generating first adjusted image data, a color reference adjustment table is generated based on the reference data and the color data, and the adjusted image data generation method further comprises generating third adjusted image data by adjusting an additional object image for image data representing the additional object image based on the color reference adjustment table, the additional object image being an image of an additional object.

11. A color difference adjusted image display method comprising:

generating, according to the color difference adjusted image data generation method according to claim 7, the color difference adjusted image data; and transmitting the color difference adjusted image data to the display device.

12. The color difference adjusted image data generation method according to claim 7, wherein in the generating a color conversion table, the color conversion table defines a matching relationship between color of an image displayed by the display device according to reference color signal data and color of an image displayed by the adjustment image data generating device according to the reference color signal data.

13. A non-transitory computer-readable storage medium that stores therein adjusted image data generation program that causes a computer to execute:

receiving image data representing an image containing both a color chart image and an object image, the color chart image being an image of a color chart, the object image being an image of an object; and generating first adjusted image data by adjusting an RGB signal indicating the object image for the image data so that color data representing colors of the color chart image matches reference data representing colors of the color chart, wherein generating the first adjusted image data includes adjusting the RGB signal in only a portion of the image containing both the color chart image and the object image that is in an adjustment target range, the adjustment target range including the object image and being smaller than an entirety of the image.

14. The non-transitory computer-readable storage medium according to claim 13, the adjusted image data generation program that further causes the computer to execute:

generating a color conversion table used to correct a color difference between an adjusted image data generating device and a display device, and generating second adjusted image data by converting a color signal of the first adjusted image data based on the color conversion table.

15. The non-transitory computer-readable storage medium according to claim 14, wherein in the generating a color conversion table, the color conversion table defines a matching relationship between color of an image displayed by the display device according to reference color signal data and color of an image displayed by the adjustment image data generating device according to the reference color signal data.

* * * * *